(12) United States Patent
Nakamura

(10) Patent No.: US 7,934,858 B2
(45) Date of Patent: May 3, 2011

(54) LIGHTING LENS AND LIGHTING DEVICE EQUIPPED WITH THE SAME

(75) Inventor: Masato Nakamura, Saitama (JP)

(73) Assignee: Enplas Corporation, Kawaguchi-shi, Saitama (JP)

( * ) Notice: Subject to any disclaimer, the term of this patent is extended or adjusted under 35 U.S.C. 154(b) by 0 days.

(21) Appl. No.: 12/608,063

(22) Filed: Oct. 29, 2009

(65) Prior Publication Data
US 2010/0110695 A1   May 6, 2010

(30) Foreign Application Priority Data

Oct. 31, 2008   (JP) ................................. 2008-281430

(51) Int. Cl.
*F21V 3/00*   (2006.01)

(52) U.S. Cl. ......... 362/311.09; 362/311.01; 362/311.06; 362/317; 362/327; 362/335

(58) Field of Classification Search ............. 362/311.01, 362/311.06, 311.09, 317, 327, 335
See application file for complete search history.

(56) References Cited

FOREIGN PATENT DOCUMENTS
JP   2007-005218 A   1/2007

*Primary Examiner* — Sandra L O Shea
*Assistant Examiner* — Meghan K Dunwiddle
(74) *Attorney, Agent, or Firm* — Kubotera & Associates LLC

(57) ABSTRACT

A lighting lens can sufficiently suppress unevenness color and improve light use efficiency. This light lens has: first incidence surface 20 that is orthogonal to the optical axis; second incidence surface 21 that expands the radius toward the light emitting element 8 side; total reflection surface 22 that expands the radius toward the emitting side; first emission surface 24 that mainly emits light incident on first incidence surface 21, toward illuminated surface 18; and second emission surface 25 that emits light incident on a second incidence surface, toward illuminated surface 18, and forms second emission surface 25 such that positive power in second emission surface 25 is weaker than positive power of first emission surface 24.

4 Claims, 29 Drawing Sheets

LIGHTING LENS AND LIGHTING DEVICE EQUIPPED WITH THE SAME

CROSS REFERENCE TO RELATED APPLICATIONS

The disclosure of Japanese Patent Application No. 2008-281430, filed on Oct. 31, 2008, including the specification, drawings and abstract, is incorporated herein by reference in its entirety.

TECHNICAL FIELD

The present invention relates to a lighting lens and a lighting device equipped with the lighting lens. More particularly, the present invention relates to a lighting lens that is suitable to control the distribution characteristics of light emitted from a light emitting element that emits white light, and a lighting device equipped with the lighting lens.

BACKGROUND ART

Spotlight devices that radiate specific areas by emitting light in specific directions are conventionally used in applications of supplementary lighting, ceiling lighting, showcase lighting and so on.

In recent years, however, white light emitting diodes (white LEDs) have started been used as light sources for spotlight devices from the perspectives of power consumption reduction and environment protection.

The mainstream of current white light emitting diodes employs mode using fluorescent materials, and are generally referred to as "bluish/yellowish pseudo white light emitting diodes."

Here, FIG. 1 shows an example of such a white light emitting diode. This white light emitting diode 1 is formed by covering a plurality of light emitting elements 3 of a plurality of blue diodes, aligned on substrate 2, with YAG fluorescent material 4. Further, this white light emitting diode 1 is designed to provide white light by mixing blue light emitted from light emitting element 3 and incident on fluorescent material 4, and yellow light produced in fluorescent material 4 as fluorescence.

However, light fluxes of white light that are emitted from white light emission surface 5 of white light emitting diode 1, diverge over a wide angle from the white light (i.e., center light) emitted in the surface normal direction of emission surface 5 at an emission angle 0 (degrees), and therefore, to adopt white light emitting diode 1 in spotlight devices, a means for concentrating white light emitted from emission surface 5 in the direction of the illuminated surface, is required.

Characteristics of such white light emitting diode 1 are known that, in light fluxes emitted from emission surface 5, the white light of the center part where the emission angle from emission surface 5 is low gives bluish white light, and the white light of the peripheral parts where the emission angles from emission surface 5 are high gives yellowish white light. This is because white light emitted as blue light from light emitting element 3 at a low emission angle passes through a short optical path in fluorescent material 4 connecting light emitting elements 3 and emission surface 5, and therefore the proportion of white light mixed with yellow light during the course of fluorescent material 4 is low. Moreover, because white light emitted as blue light from light emitting element 3 at a high emission angle passes through a long optical path in fluorescent material 4 connecting light emitting elements 3 and emission surface 5, the proportion of white light mixed with yellow light during the course of fluorescent material 4 is high.

Accordingly, taking such characteristics of white light emitting diode 1 into account, in order to adopt white light emitting diode 1 in spotlight devices, a means for preventing bluish white light and yellowish white light from generating unevenness color on the illuminated surface, is required.

So far, a technique is proposed as disclosed in, for example, Patent Literature 1 that, by arranging a lens on the emitting side of white light emitting diode 1 and applying light diffusion processing to the lens forming surface provided on optical paths of yellowish white light, yellowish white light is diffused and white light emitted from the white light diode is concentrated toward the illuminated surface, and bluish white light and yellowish white light that reach the illuminated surface are mixed to prevent unevenness color (see, for example, Patent Literature 1, paragraph [0020]).

CITATION LIST

Patent Literature

PTL 1: Japanese Patent Application Laid-Open No. 2007-5218

SUMMARY OF INVENTION

Technical Problem

However, with the lens disclosed in Patent Literature 1, a convex surface of a high curvature is formed to face the white light emitting diode side and the incidence angle of white light on this convex surface increases. Consequently, due to the wavelength dependency of the refraction index, the refraction angles of the blue light and the yellow light forming white light do not match, and color separation in which white light is separated into blue light and yellow light occurs.

As a result of this, with the lens disclosed in Patent Literature 1, it is difficult to sufficiently suppress unevenness color on the illuminated surface.

Further, because the lens disclosed in Patent Literature 1 scatters light in directions in addition to required directions by diffusing yellowish white light, there is a problem that loss is huge and bright illuminating light cannot be provided.

Further, to solve problems with the lens disclosed in Patent Literature 1, it is possible to, for example, provide a plano-convex lens having the flat surface oriented toward the white light emitting diode and the convex surface oriented toward the illuminated surface.

Naturally, with this plano-convex lens, the incidence angle of white light incident on the outer rim part of the convex surface of the plano-convex lens increases, it is still difficult to suppress unevenness color on the illuminated surface due to occurrence of color separation. Further, there is a problem that light use efficiency is poor because light having a high incidence angle on the convex surface exhibits a high reflectance on the surface of the convex surface, and cannot enter the lens.

Solution to Problem

In view of above, it is therefore an object of the present invention to provide a lighting lens that sufficiently suppresses unevenness color and that provides good light use efficiency, and a lighting device equipped with the lighting lens.

To achieve the above object, the present invention is a lighting lens that allows incidence of white light emitted from a light emitting element and that adjusts the incident white light to light of desired light distribution characteristics and emits the white light to an illuminated surface side, and employs a configuration which includes: an opposing surface part that opposes the light emitting element and that is arranged to oppose the light emitting element; an emission surface part that is formed on an opposite side of the light emitting element opposing the opposing surface part that opposes the light emitting element; and a side surface part that extends from an outer peripheral end part of the opposing surface part that opposes the light emitting element, to an outer peripheral end part of the emission surface part, and in which: a concave part that allows the white light to enter inside the lighting lens is formed in the opposing surface part that opposes the light emitting element; the concave part has: a first incidence surface that is formed as a plane orthogonal to an optical axis; and a second incidence surface that is formed to extend from an outer peripheral end part of the first incidence surface to the light emitting element side and expand a diameter gradually toward the light emitting element; the side surface part has a total reflection surface that is formed to expand a diameter gradually from the side of the opposing surface part that opposes the light emitting element, to the emission surface part side such that light having been incident on the second incidence surface is totally reflected toward the emission surface part; the emission surface part has: a first emission surface that mainly allows incidence of light having been incident on the first incidence surface and that emits the incident light to the illuminated surface side; and a second emission surface that is connected to an outer peripheral end part of the first emission surface, surrounding the first emission surface, that allows incidence of the light having been incident on the second incidence surface and totally reflected by the total reflection surface, and that emits the incident light to the illuminated surface side; and the second emission surface is formed such that positive power in the second emission surface is weaker than positive power in the first emission surface and radiates light upon the illuminated surface by mixing the light emitted from the first emission surface and the light emitted from the second emission surface.

By this means, the present invention can prevent the incidence angle of light on the first incidence surface from increasing and prevent the incidence angle of light on the second emission surface from increasing, so that it is possible to prevent color separation from occurring on the first incidence surface and the second emission surface, sufficiently suppress unevenness color of illuminating light on the illuminated surface and improve light use efficiency.

DESCRIPTION OF EXAMPLES

Figure 1:
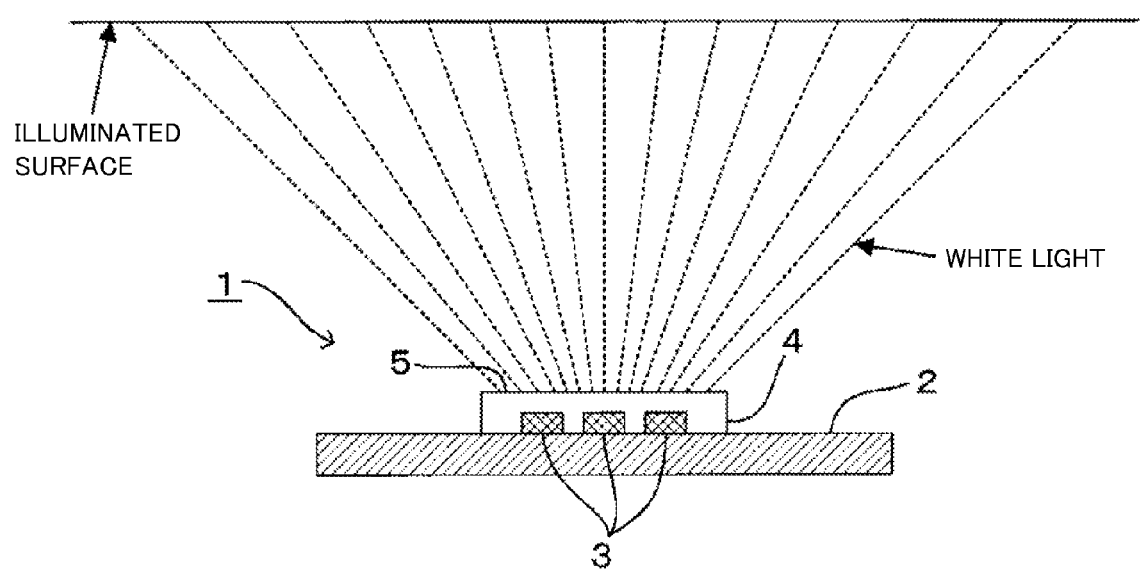
FIG. 1 is a schematic view showing an example of a white light emitting diode.

An embodiment of the present invention will be explained in detail with reference to the accompanying drawings.

EMBODIMENT 1

An embodiment of a spotlight lens according to the present invention, which is a lighting lens used in a spotlight device, will be explained with reference to FIG. 2 to FIG. 5.

Further, parts having the same or similar basic configurations as the conventional configuration, will be explained using the same reference numerals.

Figure 2:
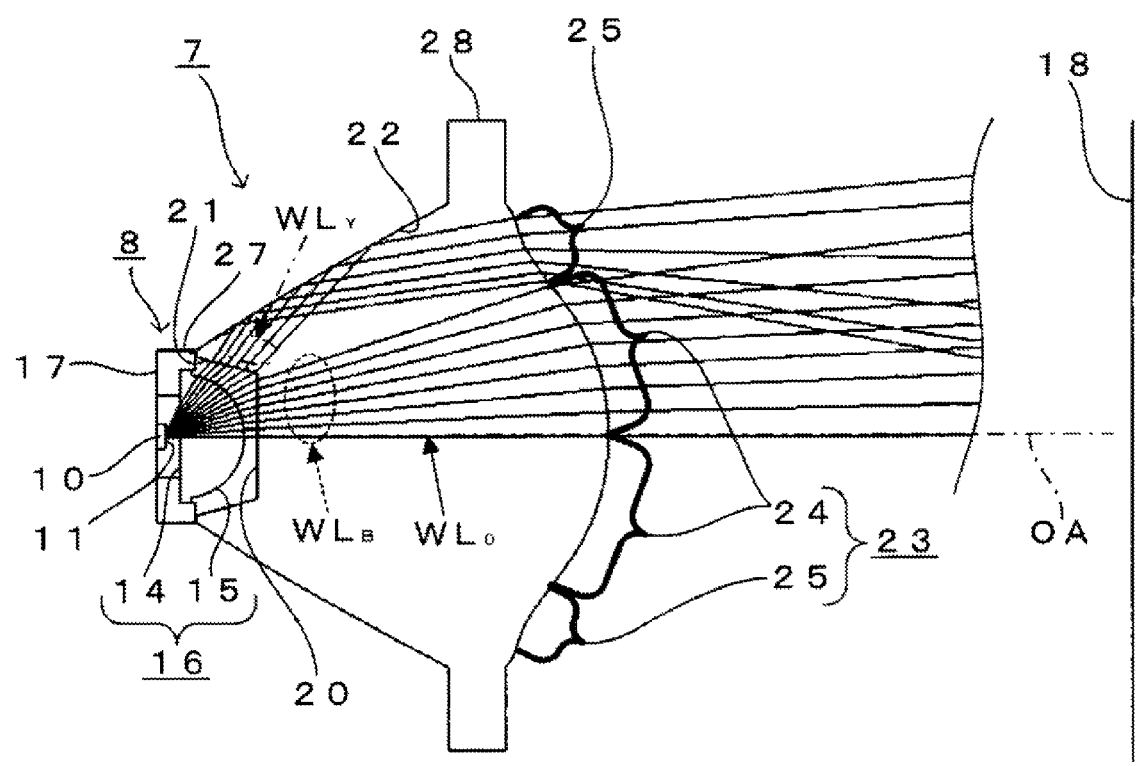
FIG. 2 is a configuration diagram showing an embodiment of a lighting lens and a lighting device according to the present invention.

As shown in FIG. 2, spotlight lens 7 according to the present embodiment is arranged to oppose white light emitting diode 8 of a point-like-light-source that emits white light, and makes a spotlight device together with this white light emitting diode 8.

Here, similar to, for example, the illustration of FIG. 1, white light emitting diode 8 according to the present embodiment has light emitting part 10 formed with, for example, a combination of a fluorescent material and light emitting elements of blue light emitting diodes, and, emission surface 11 of this light emitting part 10 is designed to emit light fluxes of white light over a predetermined range of angles around the white light $WL_0$ of the emission angle 0 (degrees) (that is, the light emitted toward the surface normal direction of emission surface 11).

Further, with the present embodiment, in the white light emitted from emission surface 11, white light (light bundled by the broken line frame in FIG. 2) of the center part where the emission angle from emission surface 11 is low around white light $WL_0$ of an emission angle 0 (degrees), gives bluish white light $WL_B$, and white light (light bundled by the chain double-dashed line frame in FIG. 2) of the peripheral parts where the emission angles from emission surface 11 are high, gives yellowish white light $WL_Y$.

Further, in a position on the emission side of white light in light emitting part 10, white light emitting diode 8 according to the present embodiment has plano-convex condenser lens 16 having flat surface 14 oriented toward light emitting part 10 and convex surface 15 oriented toward spotlight lens 7, and this condenser lens 16 is accommodated in housing 17 together with light emitting part 10.

Consequently, white light emitted from light emitting part 10 is concentrated by condenser lens 16 and then emitted from white light emitting diode 8. Further, in white light emitted from light emitting part 10, the white light of the emission angle 0 (degrees) is emitted passing on the optical axis (not shown) of condenser lens 16 while maintaining the emission angle 0 (degrees) with respect to the apex of the surface of convex surface 15.

Figure 7:
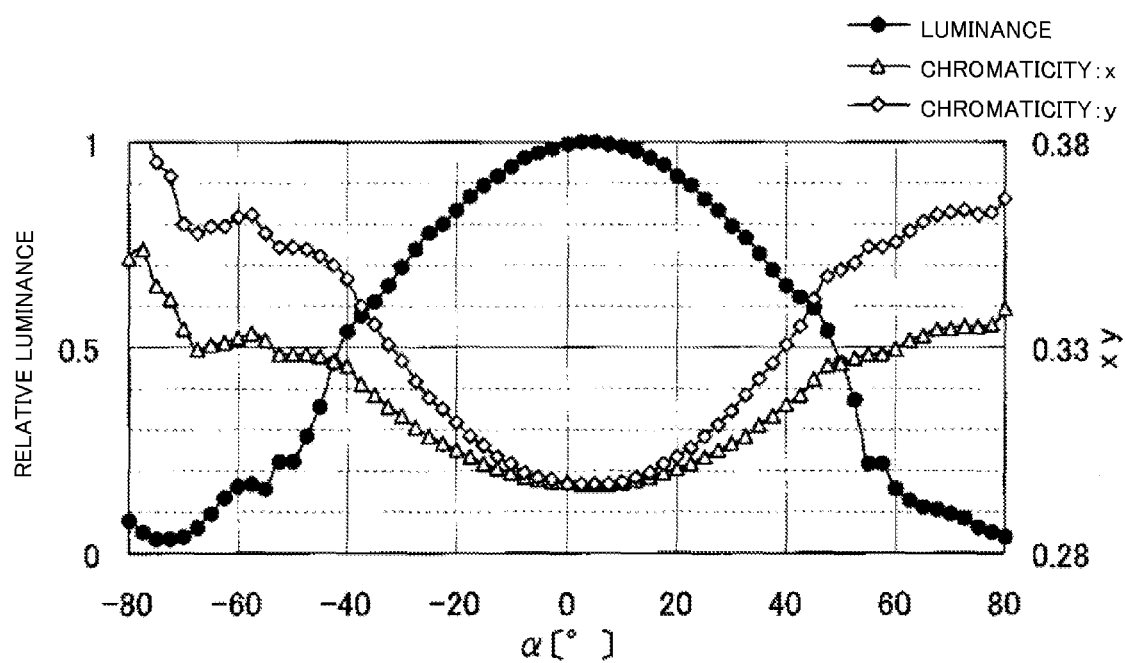
FIG. 7 is a graph showing a chromaticity and luminance measurement test result of the sample in comparison example 1.

Furthermore, the distribution of light emitted from this white light emitting diode 8 is as shown in FIG. 7 (described later). Spotlight lens 7 according to the present embodiment is designed to allow incidence of white light emitted from white light emitting diode 8, and adjust this incident white light to white light having the desired light distribution characteristics and emit this white light toward illuminated surface 18.

That is, spotlight lens 7 according to the present embodiment has: an opposing surface part that opposes a light emitting diode and that is arranged to oppose white light emitting diode 8 of the opposing surface part that opposes light emitting element; an emission surface part that is formed on the other side of white light emitting diode 8 opposing the opposing surface part that opposes the light emitting diode; and side surface parts that extend from the outer peripheral end parts of the opposing surface part that opposes the light emitting diode, to the outer peripheral end parts of the emission surface part.

In the opposing surface part that opposes the light emitting diode, a concave part for allowing white light emitted from white light emitting diode 8 to enter inside spotlight lens 7, and this concave part has two incidence surfaces of first incidence surface 20 and second incidence surfaces 21, as shown in FIG. 2. The concave part accommodates a point-like-light-source.

Figure 3:
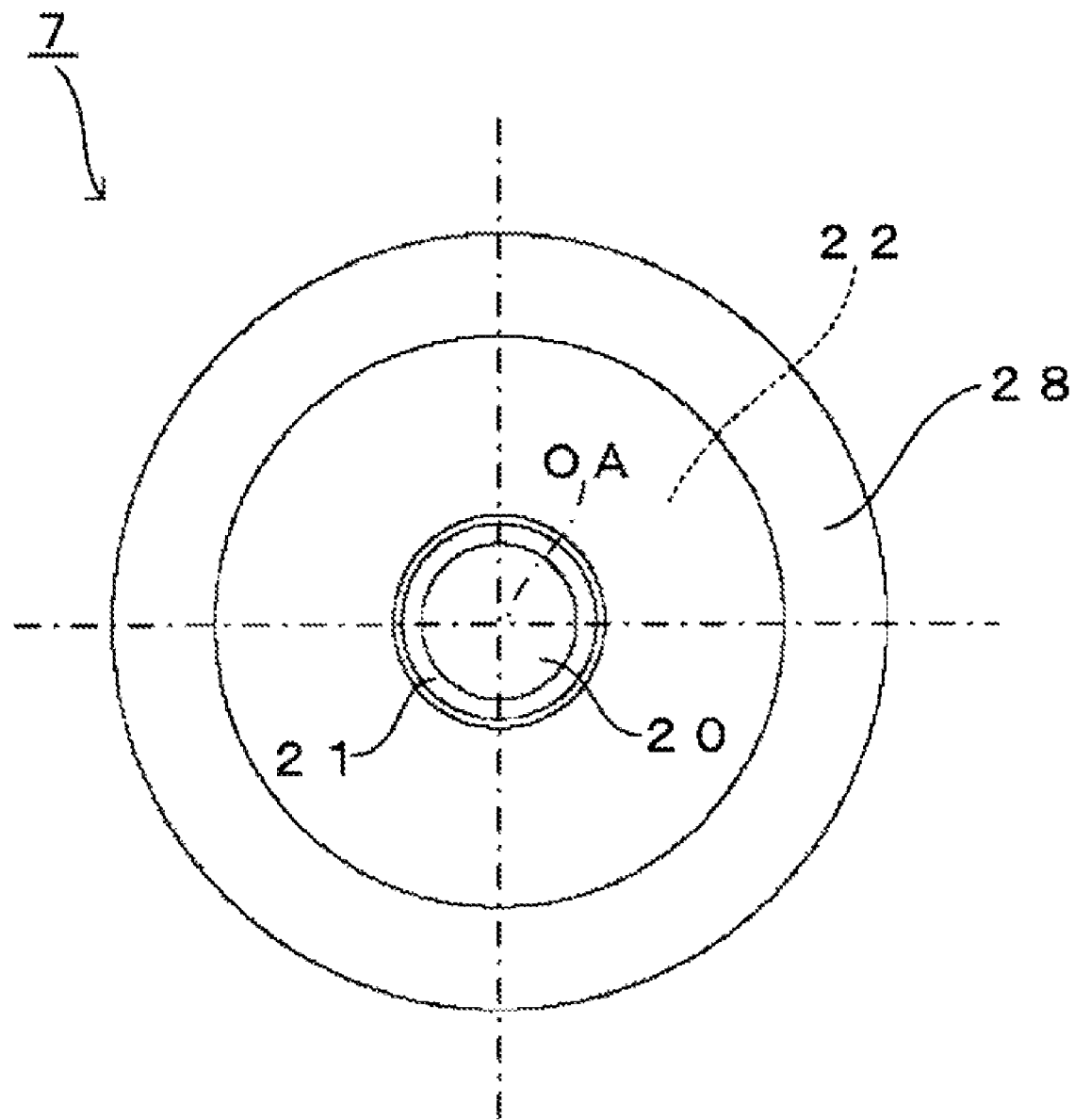
FIG. 3 shows the lighting lens of FIG. 2 from the white light emitting diode side.

As shown in FIG. 2 and FIG. 3, first incidence surface 20 is formed as a circular plane, from a plan view seen from a direction parallel to the optical axis OA (dashed line part in FIG. 2 and FIG. 3) of spotlight lens 7, and faces condenser lens 16 and light emitting part 10 in a state spotlight lens 7 is arranged to oppose white light emitting diode 8.

Here, the optical axis OA of spotlight lens 7 refers to the center line that is imagined on the center of three dimensional light fluxes emitted from spotlight lens 7, and passes the center point of first incidence surface 20. Further, in the state of FIG. 2, the optical axis OA of spotlight lens 7 matches with the center line (i.e., the optical axis of condenser lens 16) that is imagined on the center of three-dimensional light fluxes emitted from condenser lens 16.

Further, in the white light emitted from light emitting part 10, the bluish white light $WL_B$ of the center part passes condenser lens 16 and is incident on first incidence surface 20. This bluish white light $WL_B$ is refracted toward the optical axis OA at a predetermined refraction angle according to Snell's law, and moves forth (i.e., transmits) inside lens 7. Here, in this bluish white light $WL_B$, the white light $WL_0$ of the emission angle 0 (degrees) is incident on the center point of first incidence surface 20, and then passes without refraction on the optical axis OA of spotlight lens 7 and moves forth inside lens 7.

In FIG. 2, although only the optical paths in the upper half of the optical axis OA of spotlight lens 7 are shown for ease of explanation, by taking into account that spotlight lens 7 is formed in a shape that is rotationally symmetrical about the optical axis OA, it is possible to understand that, in FIG. 2, the optical paths in the upper half reversed symmetrically with respect to the optical axis OA are provided as the lower half of the optical axis OA of spotlight lens 7.

Here, as shown in FIG. 2, with the present embodiment, first incidence surface 20 is formed as a plane, so that the incidence angle of bluish white light $WL_B$ on first incidence surface 20 is kept low (where the incidence angle of white light $WL_0$ is 0 degrees). This means that the refraction angle of bluish white light $WL_B$ on first incidence surface 20 is kept low.

By this means, with the present embodiment, it is possible to prevent bluish white light $WL_B$ incident on first incidence surface 20, from separating into blue light and yellow light.

As shown in FIG. 2 and FIG. 3, second incidence surface 21 is connected to first incidence surface 20, and is formed to extend from the outer peripheral end part of this first incidence surface 20 to the white light emitting diode 8 side and expand its diameter gradually toward white light emitting diode 8. To be more specific, second incidence surface 21 is formed as the tapered surface that increases its radius toward white light emitting diode 8 and that defines the optical axis OA as the center axis.

Then, in the white light emitted from light emitting part 10, yellowish white light $WL_Y$ of the peripheral parts passes condenser lens 16 and is incident on this second incidence surface 21. This yellowish white light $WL_Y$ is refracted toward a side moving away from the optical axis OA at a predetermined refraction angle, and moves forth inside lens 7 toward total reflection surface 22 (described later).

Here, second incidence surface 21 is formed as the tapered surface that increases its radius toward white light emitting diode 8 to keep low incidence angles of yellowish white light $WL_Y$, which is emitted at a high emission angle from emission surface 11, when white light $WL_Y$ is incident on second incidence surface 21. This means that the refraction angle of yellowish white light $WL_Y$ on second incidence surface 21 is kept low.

By this means, with the present embodiment, it is possible to prevent yellowish white color $WL_Y$ incident on second incidence surface 21, from separating into blue light and yellow light.

Further, as shown in FIG. 2, the opposing surface part that opposes the light emitting element has flat surface 27 that serves as a positioning part for fixing spotlight lens 7 to housing 17 of white light emitting diode 8, and this flat surface 27 is formed in an annular shape orthogonal to the optical axis OA of spotlight lens 7 that is connected to the end part of second incidence surface 21 on the white light emitting diode 8 side. That is, as shown in FIG. 2, flat surface 27 abuts on the end surface of the spotlight lens 7 side in housing 17 of white light emitting diode 8, thereby positioning white light emitting diode 8 in the arrangement position.

Further, with the present embodiment, the side surface parts each have total reflection surface 22 and flange part 28 as shown in FIG. 2.

Total reflection surface 22 is formed to expand its diameter gradually from the opposing surface part that opposes the light emitting element, toward the emission surface part (i.e., the right direction in FIG. 2). In other words, total reflection surface 22 is formed as the tapered surface that extends toward illuminated surface 18 from the outer peripheral end part of flat surface 27 to flange part 28, and that defines the optical axis OA as the center axis which increases the radius toward illuminated surface 18. Further, total reflection surface 22 is formed in virtually the entire outer surface of spotlight lens 7.

In this total reflection surface 22, yellowish white light $WL_Y$ having been incident on second incidence surface 21 and moved forth inside lens 7, is incident at an incidence angle beyond the critical angle. Then, white light $WL_Y$ incident on total reflection surface 22 is totally reflected toward the emission surface part by total reflection surface 22. Yellowish white light $WL_Y$ that is totally reflected by this total reflection surface 22 moves forth inside lens 7 toward the emission surface part.

At this time, in total reflection surface 22, refraction does not occur, and therefore color separation of yellowish white light $WL_Y$ incident on total reflection surface 22 does not occur.

Further, with the present embodiment, the emission surface part has emission surface 23 formed in the convex, aspheric surface that is oriented toward illuminated surface 18, in a position to oppose first incidence surface 20 and second incidence surface 21 in the direction of the optical axis across the thickness of the lens.

Figure 4:
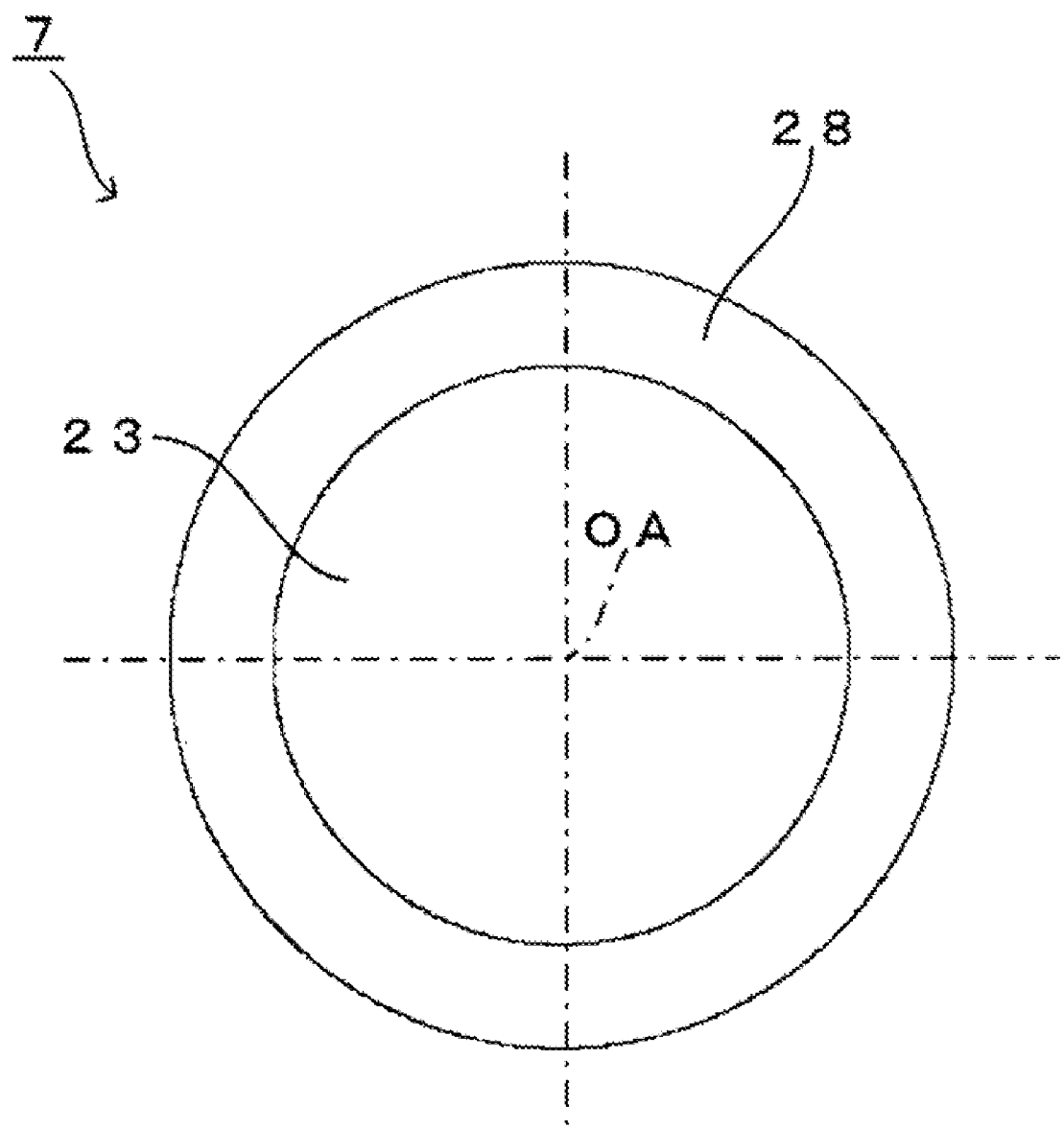
FIG. 4 shows the lighting lens of FIG. 2 from the illuminated surface side.

As shown in FIG. 2 and FIG. 4, emission surface 23 according to the present embodiment is formed in a circular shape from a plan view, and defines its center point as the apex of the surface crossing the optical axis OA.

To be more specific, emission surface 23 according to the present embodiment is formed as the convex surface which orients a large part of its area of the optical axis OA side (i.e., the center side), toward illuminated surface 18, and as the convex aspheric surface part which is partially concave and has a concave surface that is oriented toward illuminated surface 18, in the area of the peripheral side (i.e., outside the radial direction).

Further, in addition to this configuration, a configuration is possible where emission surface 23 is formed as an aspheric surface, which is convex over an entire surface, and which makes positive power weaker from the optical axis OA side to the peripheral side. In this case, the aspheric surface shape of emission surface 23 may be shaped such that positive power becomes weaker continuously toward the periphery, or may be shaped such that positive power becomes weaker stepwise toward the periphery. Further, an example of a surface shape that makes positive power weaker stepwise includes a surface shape connecting the surface shape of the optical axis OA side that has constant positive power and the surface shape of the peripheral side that has weaker positive power than the constant positive power in the former surface shape.

Furthermore, with the present embodiment, the area over a predetermined range of emission surface 23 on the optical axis OA side is defined as first emission surface 24, and this first emission surface 24 allows incidence of bluish white light $WL_B$ having been incident on first incidence surface 20 and moved forth inside lens 7. Then, white light $WL_B$ having been incident on this first emission surface 24 is refracted at a predetermined refraction angle in first emission surface 24, and is emitted from first emission surface 24 to the illuminated surface 18 side.

With the present embodiment, the area that has a predetermined range in emission surface 23 on the peripheral side and that is connected to the outer peripheral end part of first emission surface 24 such that first emission surface 24 is surrounded, is defined as second emission surface 25, and this second emission surface 25 is formed such that positive power is weaker than positive power in first emission surface 24. Here, in the present specification, "weak positive power" also means "negative power" (that is to say, the surface is concave).

This second emission surface 25 allows incidence of yellowish white light $WL_Y$ having been incident on second incidence surface 21, then totally reflected by total reflection surface 22 and moved forth inside lens 7. Then, white light $WL_Y$ incident on this second emission surface 25 is refracted at a predetermined refraction angle on second emission surface 25 and is emitted from second emission surface 25 to the illuminated surface 18 side.

At this time, positive power is suppressed in second emission surface 25, so that it is possible to keep the incidence angle of yellowish white light $WL_Y$ on second emission surface 25 low.

By this means, with the present embodiment, it is possible to prevent yellowish white light $WL_Y$ that is incident on second emission surface 25, from separating into blue light and yellow light.

Then, bluish white light $WL_B$ emitted from first emission surface 24 and yellowish white light $WL_Y$ emitted from second emission surface 25 are radiated as circular, white illuminating light, in a mixed state upon illuminated surface 18 spaced a predetermined distance apart from spotlight lens 7 in the direction of the optical axis OA.

In this way, spotlight lens 7 according to the present embodiment can effectively prevent color separation from occurring on first incidence surface 20 and second emission surface 25 and, consequently, sufficiently suppress unevenness color of illuminating light on illuminated surface 18. To be more specific, it is possible to prevent an intense, yellow portion (i.e., yellow ring) from being formed in the outer rim part of illuminated surface 18 irradiated by illuminating light.

It is equally possible to make part of yellowish white light $WL_Y$ having been incident on second incidence surface 21 incident on first emission surface 24 and emit from first emission surface 24.

More preferably, the light distribution characteristics of white light $WL_B$ at the time when bluish white light $WL_B$ incident on first incidence surface 20 is emitted from first emission surface 24, are matched with the light distribution characteristics of white light $WL_Y$ at the time when yellowish white light $WL_Y$ incident on second incidence surface 21 is emitted from emission surface 23 (i.e., emission surface part), or these characteristics are made approximate, such that the difference between these characteristics (for example, the differences between a spread of a light flux and the luminous intensity [cd] or luminance [lx] at each measurement angle (described later)) settles within a predetermined value. At this time, because the degree of overlap between the spread of a light flux emitted from first emission surface 24 and the spread of a light flux emitted from second emission surface 25 influences the degree of suppression of unevenness color, it is important to make the light distribution characteristics of two white lights $WL_B$ and $WL_Y$ match or become approximate.

With such a configuration, it is possible to more effectively suppress unevenness color of illuminating light on illuminated surface 18.

More preferably, the conditional equation shown in following equation 1 needs to be satisfied.

$$\theta 1\ max > \theta 2\ max \qquad \text{(Equation 1)}$$

Here, $\theta 1$ max in equation 1 is the maximum value of angle $\theta 1$ (i.e., an acute angle) formed inside lens 7 by the optical axis OA and light (bluish white light $WL_B$) having been emitted from a light emitting spot of white light emitting diode 8 and incident on first incidence surface 20. Moreover, $\theta 2$ max in equation 1 is the maximum value of angle $\theta 2$ (i.e., an acute angle) formed inside lens 7 by the optical axis OA and light (yellowish white light $WL_Y$) having been emitted from a light emitting spot of white light emitting diode 8 and totally reflected by total reflection surface 22.

Here, the light emitting spot is defined as a point where the optical axis of white light emitting diode 8 and emission surface 11 in light emitting part 10 of white light emitting diode 8 cross with each other. Although a spotlight source such as white light emitting diode 8 actually emits light from its surface, to realize easy and precise optical design, it is desirable to define the light emitting spot as in the present embodiment and make light, which is emitted from this light emitting spot, represent light fluxes of white light emitting diode 8.

Figure 5:
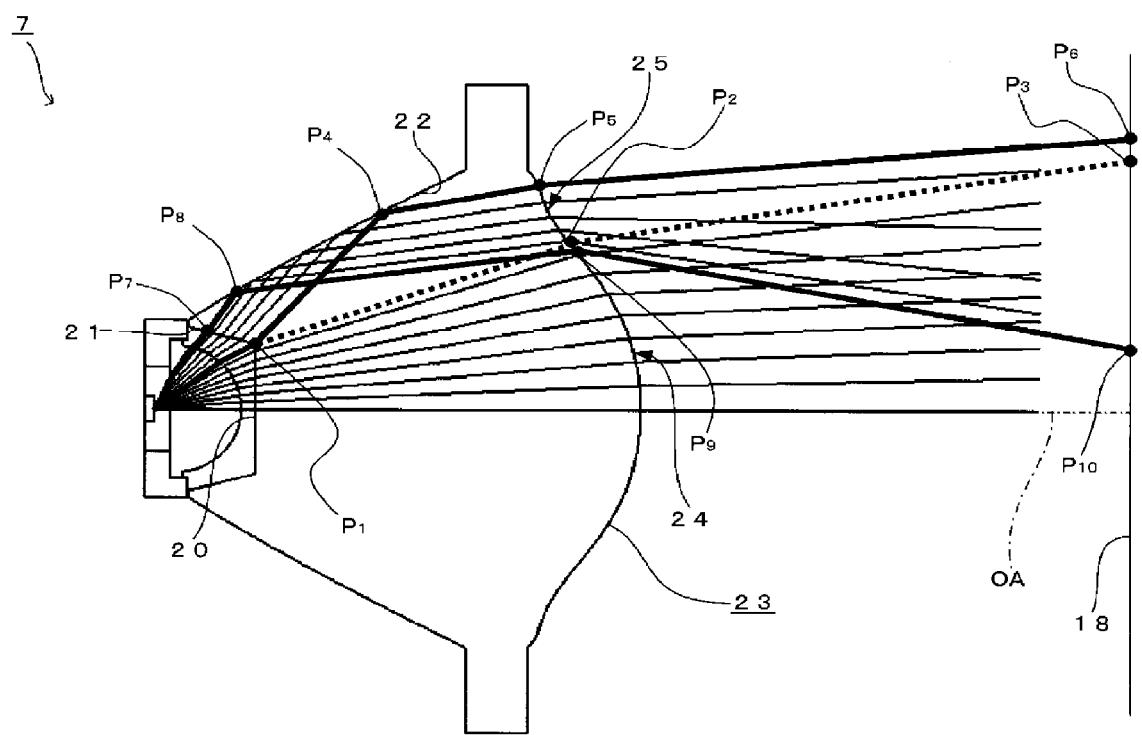
FIG. 5 explains equations 1 to 3 in an embodiment of the lighting lens according to the present invention.

Further, as shown in FIG. 5, in case where intersection P1 of first incidence surface 20 and second incidence surface 21 is defined on spotlight lens 7 as point P1, and arriving point P2 where light incident near P1 on first incidence surface 20 arrives at emission surface 23 (i.e., emission surface part), is defined as point P2, preferably, $\theta 1$ max in equation 1 is an angle formed by line segment P1P2 and the optical axis OA of spotlight lens 7. Further, $\theta 1$ max is a positive acute angle in case where the rules of positive/negative angles where the angle formed counterclockwise with respect to the optical axis OA is positive, are applied.

Further, as shown in FIG. 5, in case where arriving point P4 where light incident near point P1 on second incidence surface 21 arrives at total reflection surface 22, is defined on spotlight lens 7 as point P4, and arriving point P5 where light arrives at emission surface 23 passing point P1 and point P4, is defined as point P5, preferably, $\theta 2$ max in equation 1 is an angle formed by line segment P4P5 and the optical axis OA of spotlight lens 7. Further, $\theta 2$ max is a positive acute angle in case where the rules of positive/negative angles similar to the case of $\theta 1$ max are applied.

By satisfying equation 1, it is possible to form second emission surface 20 emitting yellowish white light $WL_Y$, such that the positive power in second emission surface 25 is weaker than the positive power in first emission surface 24 to more reliably suppress the amount of refraction of light (i.e., diffusion light) emitted from second emission surface 25. Consequently, it is possible to more effectively prevent color separation from occurring, sufficiently mix, on illuminated surface 18, bluish white light $WL_B$ emitted from emission surface 23 (mainly emission surface 24) and yellowish white light $WL_Y$ emitted from second emission surface 25, and sufficiently suppress unevenness color of illuminating light on illuminated surface 18.

More preferably, the conditional equation shown in following equation 2 is satisfied.

$$\theta P2P3 > \theta P5P6 > \theta P9P10 \qquad \text{(Equation 2)}$$

Here, as shown in FIG. 5, $\theta P2P3$ in equation 2 is an angle formed by line segment P2P3 and the optical axis OA of spotlight lens 7 in case where arriving point P3 where light arrives at illuminated surface 18 passing point P1 and point P2, is defined on spotlight lens 7 as point P3. Further, $\theta P2P3$ is a positive acute angle in case where the rules of positive/negative angles similar to the case of $\theta 1$ max are applied.

Further, as shown in FIG. 5, $\theta P5P6$ in equation 2 is an angle formed by line segment P5P6 and the optical axis OA of spotlight lens 7 in case where arriving point P6 where light arrives at illuminated surface 18 passing point P1, P4 and point P5, is defined on spotlight lens 7 as point P6. Further, $\theta P5P6$ is a positive acute angle in case where the rules of positive/negative angles similar to the case of $\theta 1$ max are applied.

Furthermore, as shown in FIG. 5, $\theta P9P10$ in equation 2 is an angle formed by line segment P9P10 and the optical axis OA of spotlight lens 7 in case where point P9 and point P10 are provided on spotlight lens 7. $\theta P9P10$ is a negative acute angle in case where the rules of positive/negative angles similar to the case of $\theta 1$ max are applied. As shown in FIG. 5, point 9 and point 10 are provided on the same optical path as point P7 and point 8 provided on spotlight lens 7. That is, point P7 is incidence point P7 that allows incidence of light emitted at an angle to provide the luminous intensity (or luminance) of a relative value 0.5 where the maximum luminous intensity (or maximum luminance) in the light distribution of white light emitting diode 8 provides a relative value 1. Further, point P8 is arriving point P8 where light incident on point P7 arrives at total reflection surface 22. Furthermore, point P9 is arriving point P9 where light arrives at emission surface 23 passing point P7 and point P8. Still further, point P10 is arriving point P10 where light arrives at illuminated surface 18 passing point P7, point P8 and point P9.

By satisfying equation 2, it is possible to sufficiently mix, on illuminated surface 18, bluish white light $WL_B$ emitted from emission surface 23 (mainly emission surface 24) and yellowish white light $WL_Y$ emitted from second emission surface 25, and sufficiently suppress unevenness color of illuminating light on illuminated surface 18.

Further, spotlight lens 7 may be formed at low cost by injection-molding a resin material such as PMMA (poly(methyl metacrylate).

EXAMPLE

Figure 6:
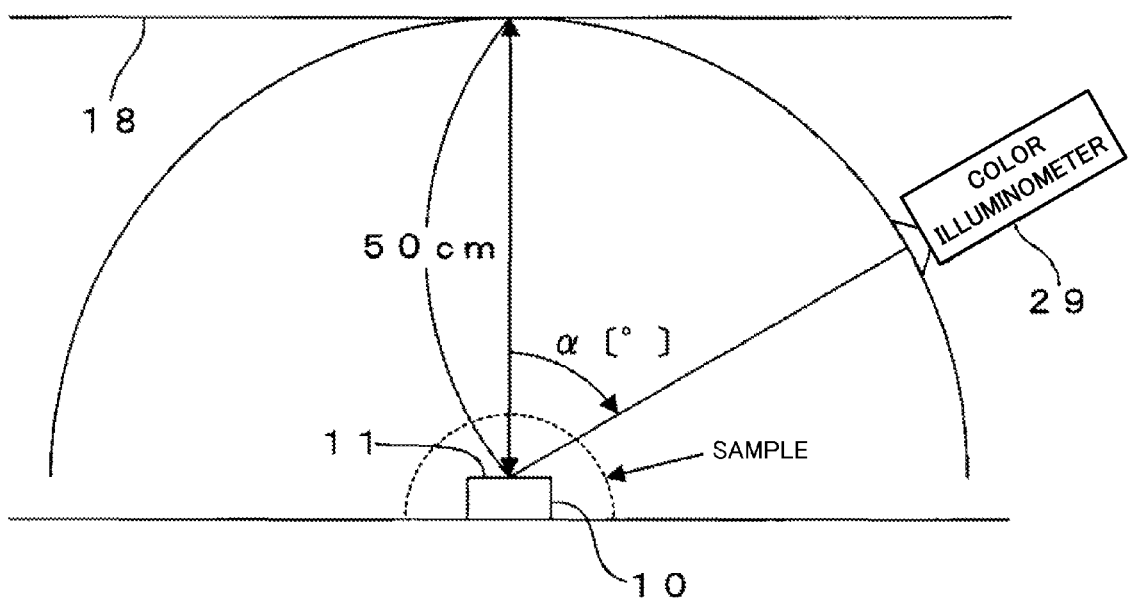
FIG. 6 shows a measurement system used for chromaticity and luminance measurement tests of samples in comparison examples 1 to 3 and examples 1 to 5 of an embodiment of the lighting lens according to the present invention.

Next, eight samples of spotlight devices that have white light emitting diodes 8 in comparison examples 1 to 3 and examples 1 to 5, are prepared to perform chromaticity and luminance measurement tests of these eight samples using the measurement system shown in FIG. 6.

In this chromaticity and luminance measurement test, by placing the sample horizontally such that the optical axis of the sample is parallel to the vertical direction, and by using color illuminometer 29 placed in a position 50 centimeters of a radius apart from emission surface 11 of light emitting part 10 of the sample, chromaticity and luminance of white light emitted from the sample are measured.

At this time, the angle (hereinafter, "measurement angle") α (degrees) formed by the surface normal line of the light incidence surface of color illuminometer 29 with respect to the optical axis of the sample is changed within the range between −80 degrees and +80 degrees, based on the optical axis (0 degrees) in the sample, and measurement results at measurement angles α (degrees) by color illuminometer 29 are shown in one graph showing the angle dependency of luminance and chromaticity.

Hereinafter, test results of measurement tests will be explained sequentially on a per sample basis.

Comparison Example 1

The sample in comparison example 1 is white light emitting diode 8 itself, and FIG. 7 shows a test result of a measurement test of the sample in this comparison example 1.

Here, the values on the horizontal axis in FIG. 7 show the measurement angle α (degrees). Further, the values on the vertical axis in FIG. 7 show relative luminance where the maximum value is normalized to 1, and x and y chromaticities. Further, in FIG. 7, when the chromaticities of X and Y are lower, the blue in white light is deeper, and, when the chromaticities of X and Y are higher, the yellow in white light is deeper.

As shown in FIG. 7, with the test result in comparison example 1, chromaticity increases from 0 degrees to ±80 degrees.

Further, as shown in FIG. 7, with the measurement result in comparison example 1, high relative luminance is maintained over a wide angle, and FWHM (Full Width at Half Maximum) (degrees) of relative luminance in this comparison example 1 is 90 degrees.

In case where the sample in this comparison example 1 radiates white light upon illuminated surface 18 provided in a position 50 centimeters from light emitting part 10 in the direction of the optical axis (i.e., vertical direction) as shown in FIG. 6, this illuminating light shows unevenness color like gradation changing from bluish white to yellowish white from the center to the periphery. Further, illuminating light in comparison example 1 provides bright light over a wide range, and is not suitable for spotlights for lighting specific areas.

Comparison Example 2

Figure 8:
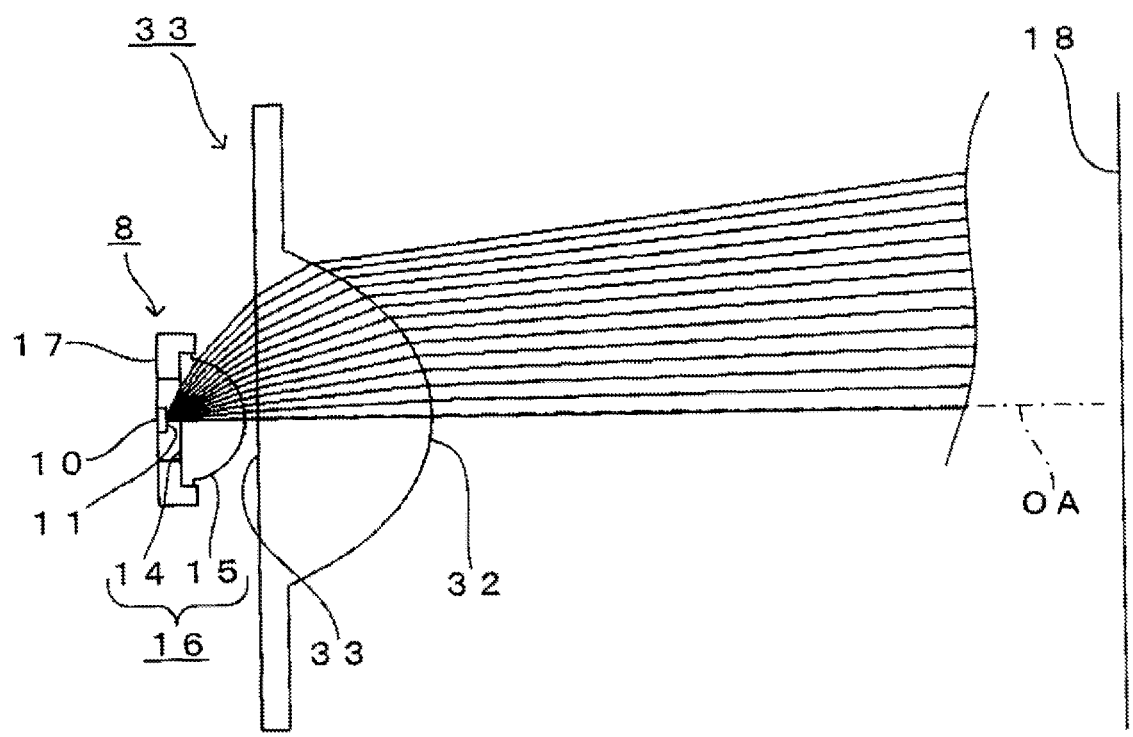
FIG. 8 is a configuration diagram showing the sample in comparison example 2.

As shown in FIG. 8, the sample in comparison example 2 is formed with white light emitting diode 8 and plano-convex lens 33 that opposes this white light emitting diode 8 and that is provided in a position near the emitting side of this white light emitting diode 8.

Further, plano-convex lens 33 has: flat surface 31 of a circular shape from a plan view that is oriented toward white light emitting diode 8; and convex surface 32 of a circular shape from a plan view that is oriented toward illuminated surface 18. Further, in FIG. 8, plano-convex lens 33 and white light emitting diode 8 are arranged in a state where their optical axes match with each other.

Figure 9:
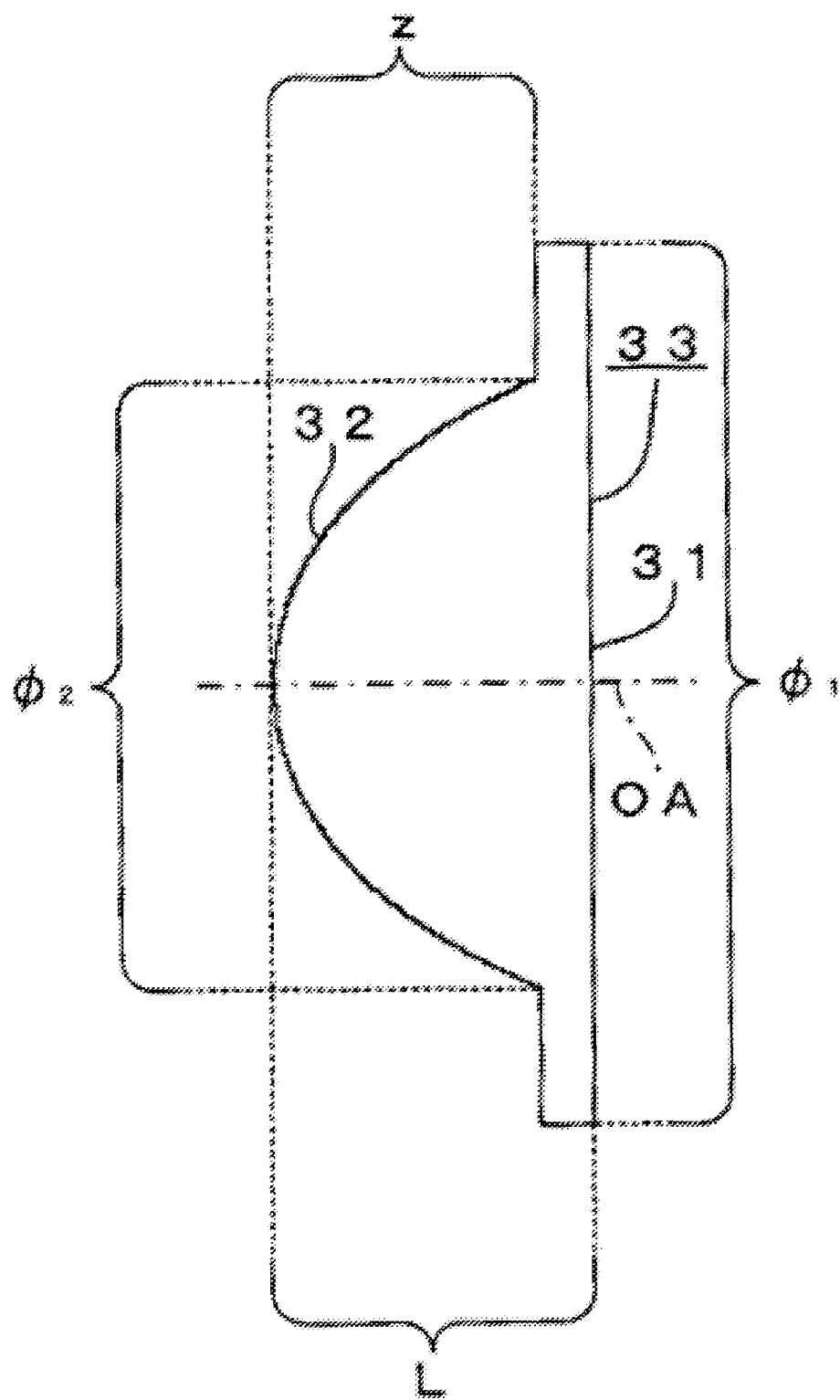
FIG. 9 illustrates a specific configuration of the sample in comparison example 2.

Further, as shown in FIG. 9, with plano-convex lens 33 in the present comparison example, the diameter of flat surface 31 represented by φ1 is 19.4 millimeters, the diameter of convex surface 32 represented by φ2 is 13.4 millimeters, the total length represented by L is 7 millimeters, and the distance represented by z between the outer peripheral end part and the apex of the surface of convex surface 32 is 5.8402 millimeters in the direction of the optical axis OA.

Further, the surface shape of convex surface 32 defines the Z axis in the direction of the optical axis OA and the X axis in the direction orthogonal to the optical axis OA, and is represented by the following equation in case where the direction in which light moves forth is positive, k is the cone coefficient, A1, A2, A3, . . . and A8 are the aspheric coefficients and c is the curvature.

$$Z(X)=cX^2/[1+\{1-(k+1)c^2X^2\}^{1/2}]+A1X+A2X^2+A3X^3+\ldots+A8X^8 \quad \text{(Equation 4)}$$

Here, with the present comparison example, coefficients in equation 4 are $c=-1.88338\times10^{-1}$, $k=-9.12031\times10^{-1}$, $A1=0$, $A2=0$, $A3=-1.80527\times10^{-3}$, $A4=-2.01390\times10^{-4}$, $A5=7.68403\times10^{-5}$, $A6=-1.06747\times10^{-5}$, $A7=-4.08247\times10^{-6}$, and $A8=4.67335\times10^{-7}$.

Figure 10:
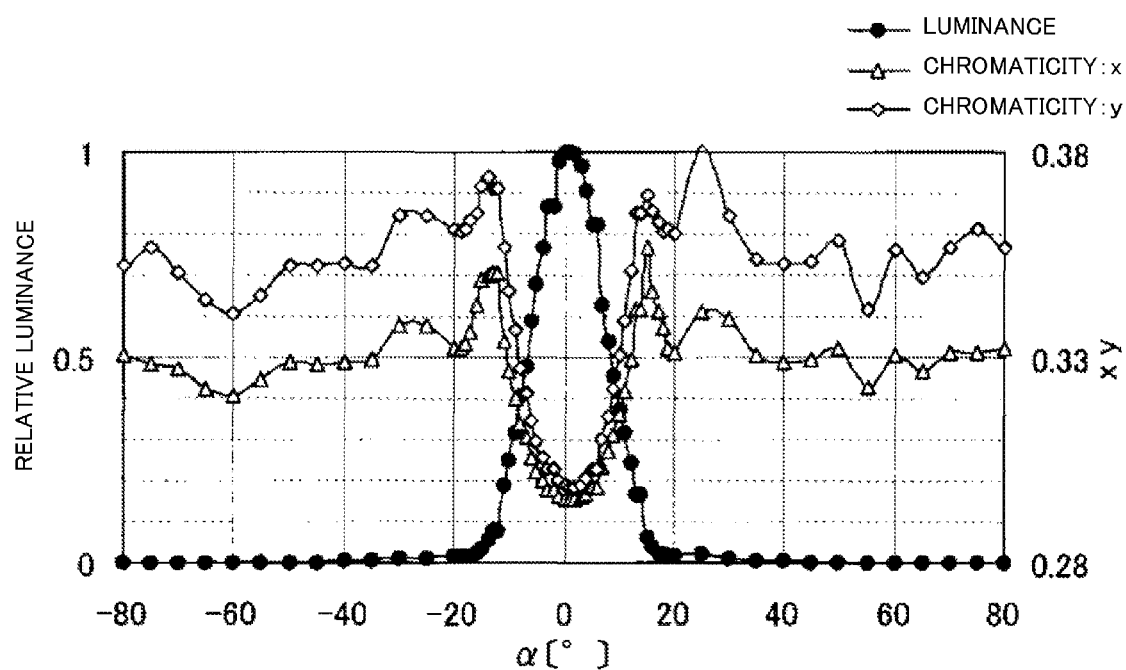
FIG. 10 is a graph showing a chromaticity and luminance measurement test result of the sample in comparison example 2.

The test result of the measurement test of the sample in this comparison example 2 is shown in FIG. 10. Further, values on the horizontal axis and the vertical axis in FIG. 10 are the same as in FIG. 7.

As shown in FIG. 10, in the test result in comparison example 2, x and y chromaticities increase steeply near ±10 degrees.

Illuminating light that is radiated upon illuminated surface 18 shown in FIG. 6 by the sample in this comparison example 2 produces an intense yellow ring in the outer rim part of a spot, and is not suitable for spotlights for lighting specific areas with uniform white color.

Comparison Example 3

Figure 11:
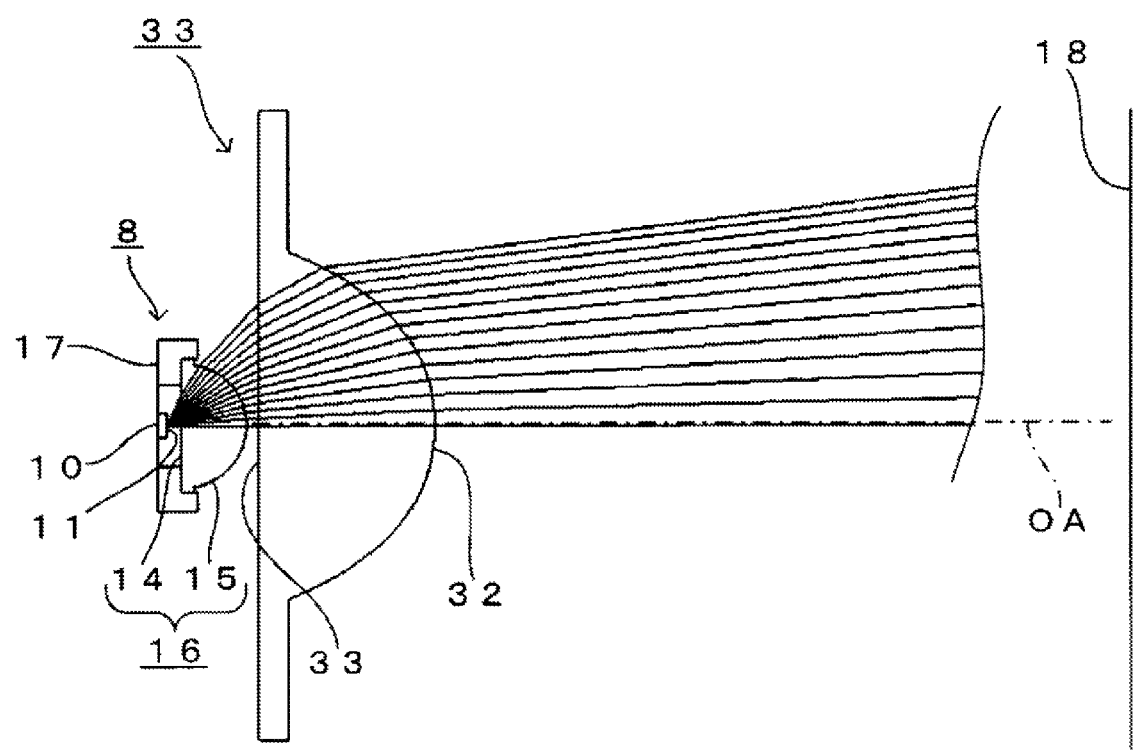
FIG. 11 is a configuration diagram showing the sample in comparison example 3.

As shown in FIG. 11, similar to comparison example 2, the sample in comparison example 3 is formed with white light emitting diode 8 and plano-convex lens 33 that orients flat surface 31 toward this white light emitting diode 8 and orients convex surface 32 toward illuminated surface 18.

Figure 12:
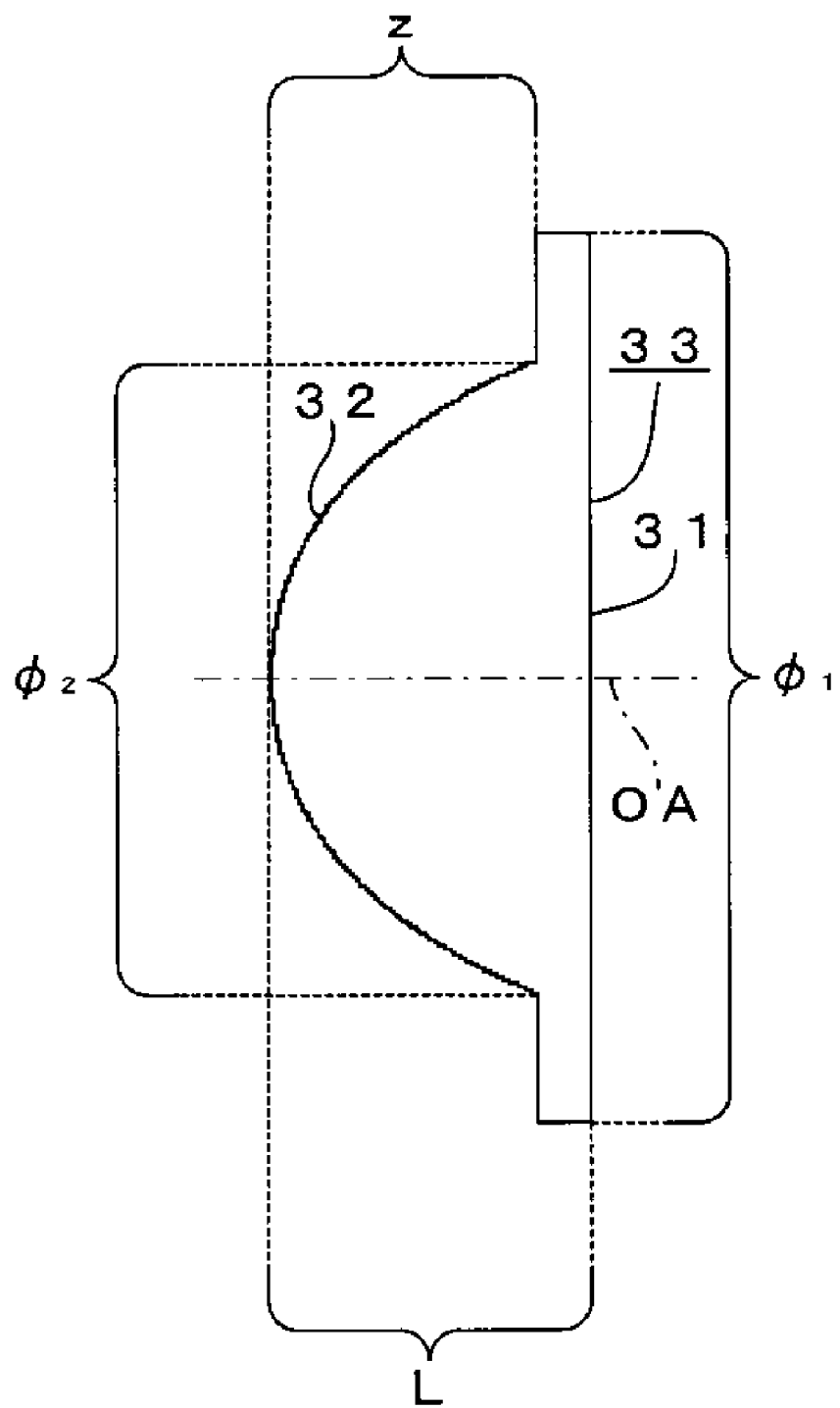
FIG. 12 illustrates a specific configuration of the sample in comparison example 3.

Further, as shown in FIG. 12, with plano-convex lens 33 in the present comparison example, the diameter of flat surface 31 represented by φ1 is 19.4 millimeters, the diameter of convex surface 32 represented by φ2 is 13.8 millimeters, the total length represented by L is 7 millimeters, and the distance represented by z between the outer peripheral end part and the apex of the surface of convex surface 32 is 5.8135 millimeters in the direction of the optical axis OA.

Further, also with the present comparison example, the surface shape of convex surface 32 is represented by using equation 2. Here, with the present comparison example, coefficients in equation 2 are $c=-1.55921\times10^{-1}$, $k=-7.90244\times10^{-1}$, $A1=0$, $A2=0$, $A3=-6.11104\times10^{-5}$, $A4=-1.41602\times10^{-3}$, $A5=2.44722\times10^{-4}$, $A6=1.25879\times10^{-6}$, $A7=-7.68650\times10^{-6}$, and $A8=6.12287\times10^{-7}$.

Figure 13:
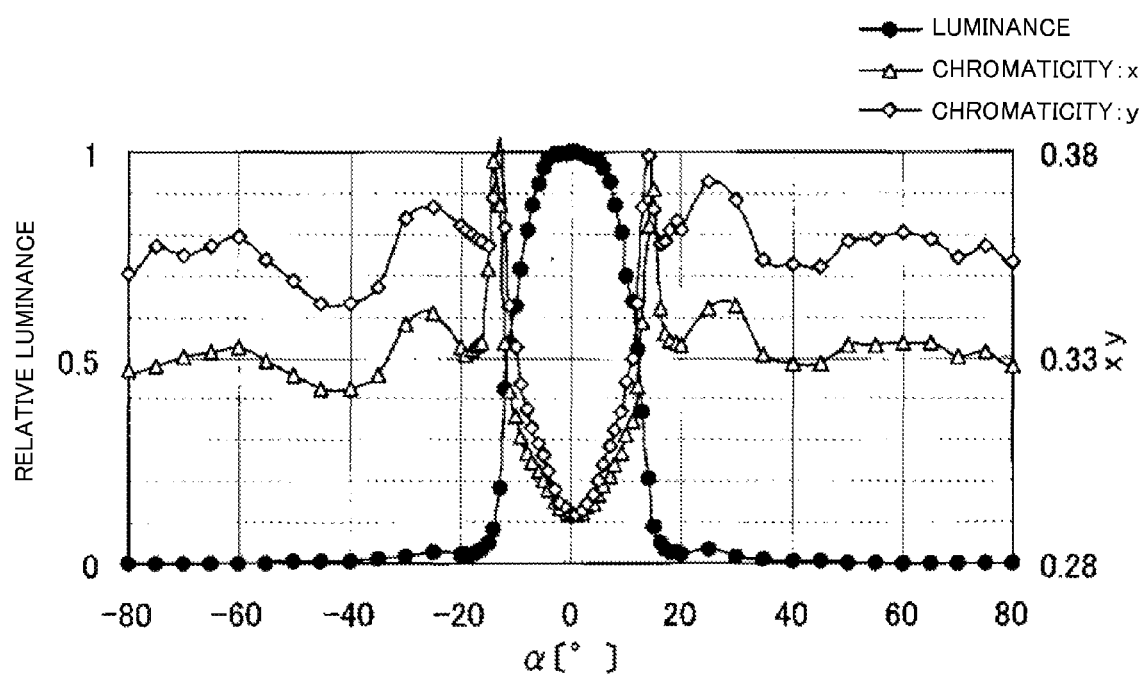
FIG. 13 is a graph showing a chromaticity and luminance measurement test result of the sample in comparison example 3.

The test result of the measurement test of the sample in this comparison example 3 is shown in FIG. 13. Further, values on the horizontal axis and the vertical axis in FIG. 13 are the same as in FIG. 7.

As shown in FIG. 13, in the measurement result in comparison example 3, x and y chromaticities increase steeply near ±10 degrees similar to comparison example 2.

Accordingly, illuminating light that is radiated upon illuminated surface 18 shown in FIG. 6 by the sample in this comparison example 3 produces an intense yellow ring in the outer rim part of a spot, and is not suitable for spotlights for lighting specific areas with uniform white color.

Example 1

The sample in example 1 has the same configuration as in FIG. 2, and is formed with white light emitting diode 8 and spotlight lens 7 that is arranged to oppose the emitting side of this white light emitting diode 8.

Spotlight lens 7 used in the spotlight device in the present example will be explained using FIG. 14.

To manufacture spotlight lens 7 of the present example, a concave part formed with first incidence surface 20 and second incidence surfaces 21 is designed as a configuration of the opposing surface part that opposes the light emitting diode, to allow light emitted from white light emitting diode 8 enter spotlight lens 7.

To design this concave part, the size of first incidence surface 20 is determined mainly based on general specifications required for spotlight devices such as FWHM of light emitted from the spotlight device and the distribution of luminance of illuminating light on illuminated surface 18. With the present example, the size of first incidence surface 20 is determined assuming FWHM 10 (degrees). Further, with the present example, to satisfy the specification (FWHM 10 (degrees)) for this spotlight device, a concave part is designed such that light fluxes emitted from white light emitting diode 8 are distributed and be incident in optimal proportions on first incidence surface 20 and second incidence surfaces 21.

Figure 14:
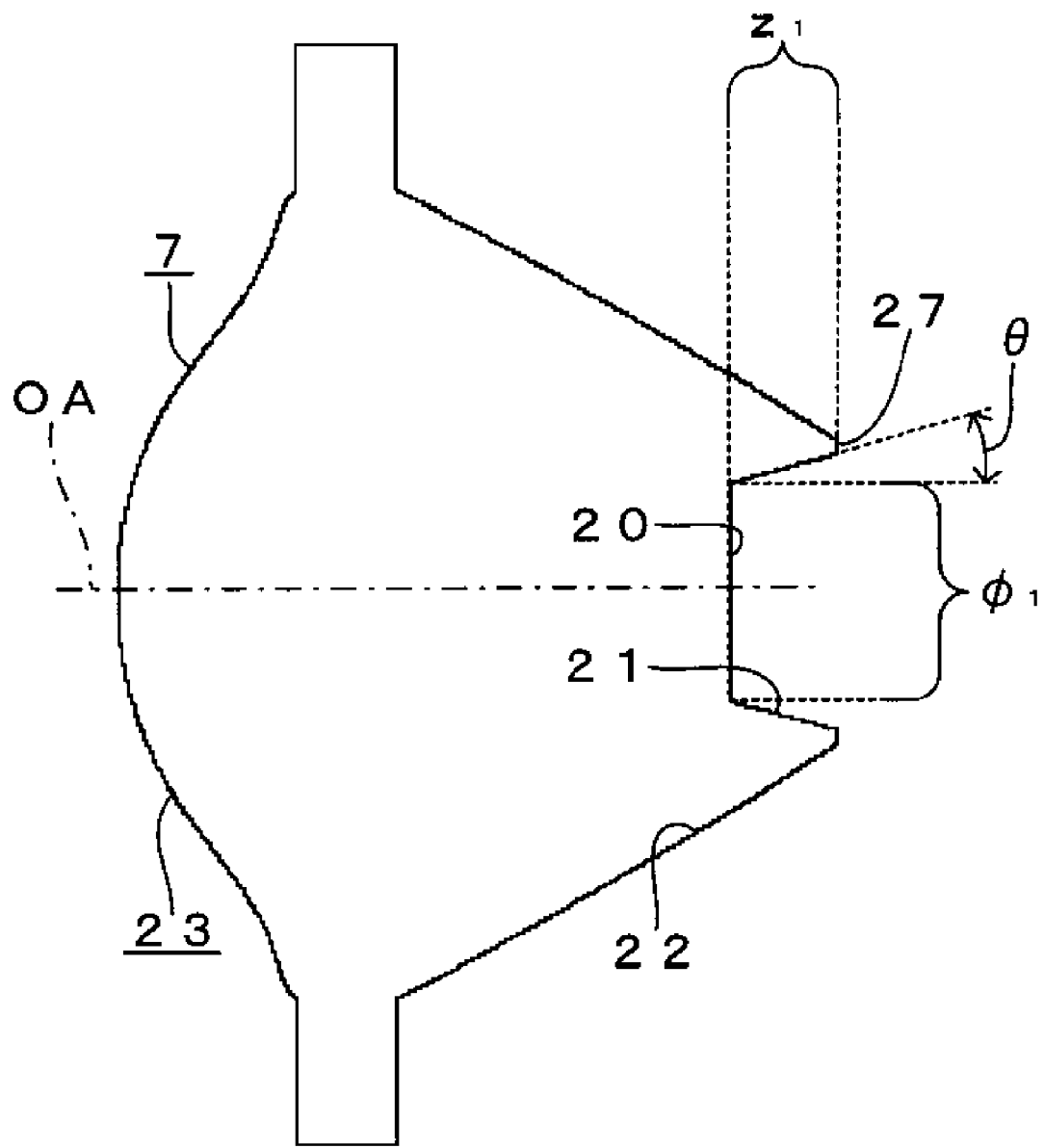
FIG. 14 illustrates a specific configuration of the sample in example 1.

To be more specific, as shown in FIG. 14, with the present example, first incidence surface 20 is designed to place its center on the optical axis OA and make its diameter φ1 5 millimeters.

Further, with the present example, first incidence surface 20 is designed to be arranged in a position where the distance z1 from the end part of the white light emitting diode 8 side in the concave part is 2.4 millimeters.

Furthermore, with the present example, second incidence surface 21 that expands its diameter from the outer peripheral end part of first incidence surface 20 to the white light emitting diode 8 side, is designed such that the angle θ formed by this incidence surface 21 and the optical axis OA is 15 degrees.

In addition to designing the concave part this way, the present example is designed such that, assuming that the position of emission surface 11 of light emitting part 10 in white light emitting diode 8 is height 0 millimeter and the direction from this position of height 0 millimeter toward the illuminated surface 18 along the optical axis OA is positive, flat plane 27 in the opposing surface part that opposes the light emitting diode is arranged in the position of the height 1.278 millimeters.

Further, with the present example, total reflection surface 22, first emission surface 24 and second emission surface 25 are designed such that θ1 max=19.31 degrees, θ2 max=10.18 degrees, θP2P3=18.31 degrees, θP5P6=3.70 degrees and θP9P10=−9.74 degrees. That is, with the present example, each surface 22, 24 and 25 is designed to satisfy each conditional equation in equations 1 and 2. To design these θ1 max, θ2 max, θP2P3, θP5P6 and θP9P10, light that is emitted from the above-described one light emitting point and that represents light emitted from white light emitting diode 8, is used.

Preferably, total reflection surface 22 is designed such that, when the position on total reflection surface 22 that reflects light becomes closer to P8 from P4, the value of above-described θ2 becomes smaller.

Further, with the present example, first emission surface 24 is designed to have positive power and second emission surface 25 is designed to have negative power.

Figure 15:
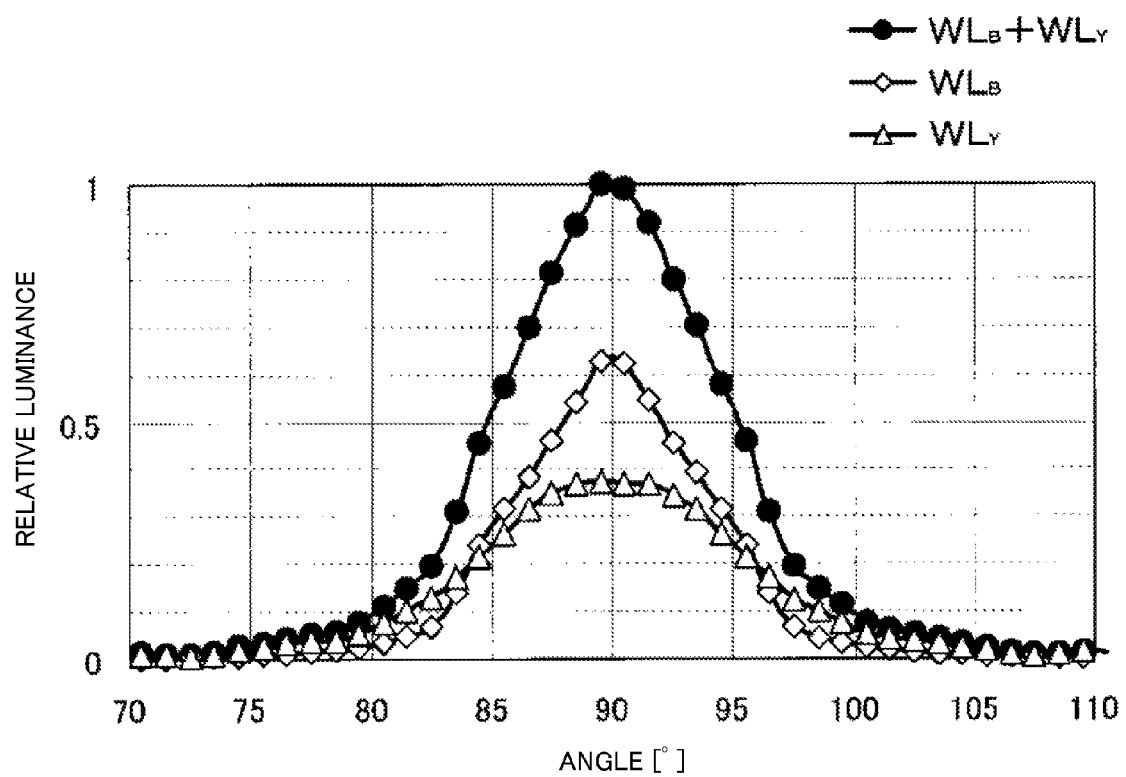
FIG. 15 is a graph showing light distribution design values of the sample in example 1.

Furthermore, with the present example, as shown in FIG. 15, light distribution is designed for all of bluish white light $WL_B$, yellowish white light $WL_Y$ and combined light $WL_B$+$WL_Y$.

The value on the horizontal axis in FIG. 15 is the emission angle (degrees) of light from emission surface 23 of spotlight lens 7 in case where the direction of the optical axis OA of spotlight lens 7 is 90 degrees, and the value on the vertical axis in FIG. 15 is relative luminous intensity that normalizes the maximum value as 1.

Figure 16:
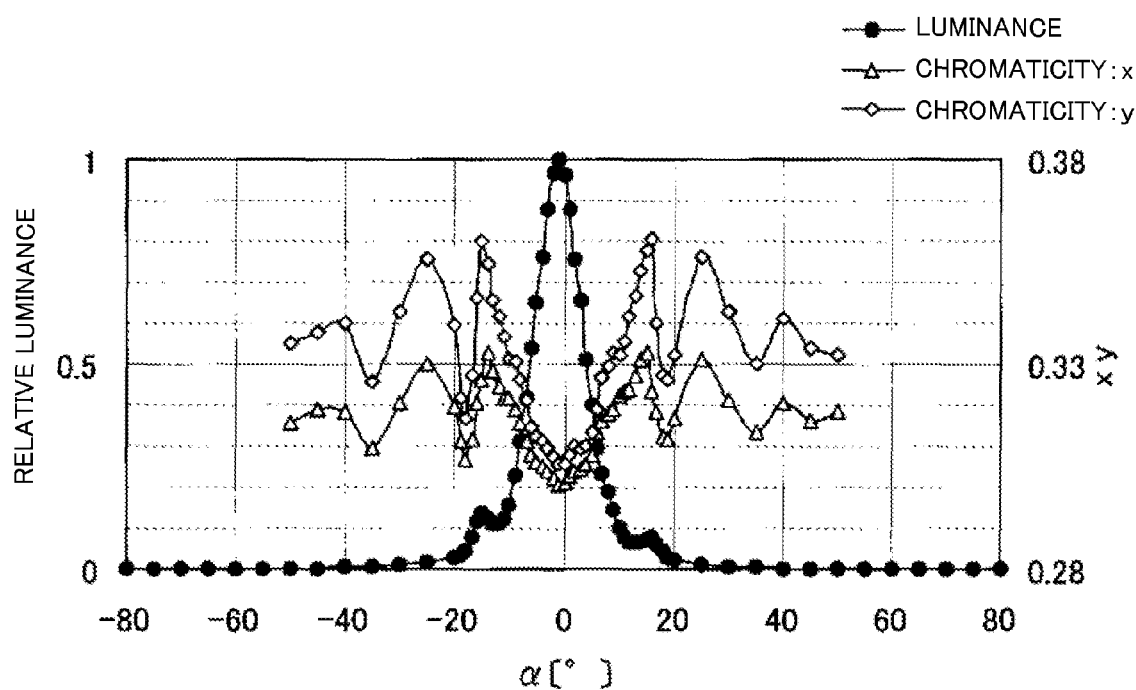
FIG. 16 is a graph showing a chromaticity and luminance measurement test result of the sample in example 1.

The test result of the measurement test of the sample in example 1 that has spotlight lens 7 manufactured based on these designs, are shown in FIG. 16. Further, values on the horizontal axis and the vertical axis in FIG. 16 are the same as in FIG. 7.

As shown in FIG. 16, with the present example, compared to comparison example 1, values for high relative luminous intensity are acquired around measurement angle α (degrees) near 0 degrees.

This means that, compared to the sample in comparison example 1, the sample in the present example is suitable for spotlighting for radiating bright white light upon specific areas.

Further, as shown in FIG. 16, with the present example, the characteristics of x and y chromaticities can be made flat near chromaticity 0.33, compared to comparison examples 1 to 3. This means that the sample in the present example is suitable for emitting illuminating light that is virtually a pure white and that produces little unevenness color compared to the samples in comparison examples 1 to 3.

Example 2

Figure 17:
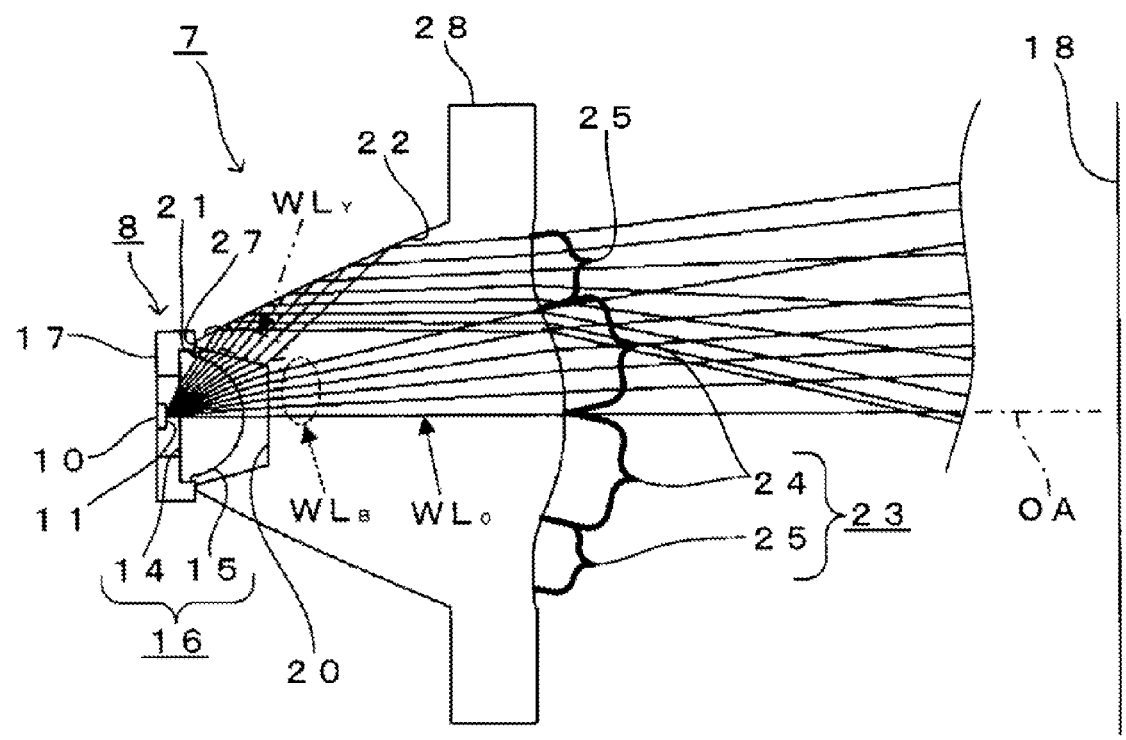
FIG. 17 is a configuration diagram showing the sample in example 2.

The sample in example 2 has the configuration shown in FIG. 17, and is formed with white light emitting diode 8 and spotlight lens 7 that is arranged to oppose the emitting side of this white light emitting diode 8.

Spotlight lens 7 used in the spotlight device in the present example will be explained using FIG. 17. As to explanation of spotlight lens 7, explanation of the same matter as in example 1 will be omitted.

Also, to manufacture spotlight lens 7 in the present example, a concave part formed with first incidence surface 20 and second incidence surfaces 21 is designed.

To design this concave part, the size of first incidence surface 20 in the present example is determined assuming FWHM 13 (degrees). Further, with the present example, to satisfy the specification (FWHM 13 (degrees)) for this spotlight device, a concave part is designed such that light fluxes emitted from white light emitting diode 8 are sorted and be incident in optimal proportions on first incidence surface 20 and second incidence surfaces 21.

Figure 18:
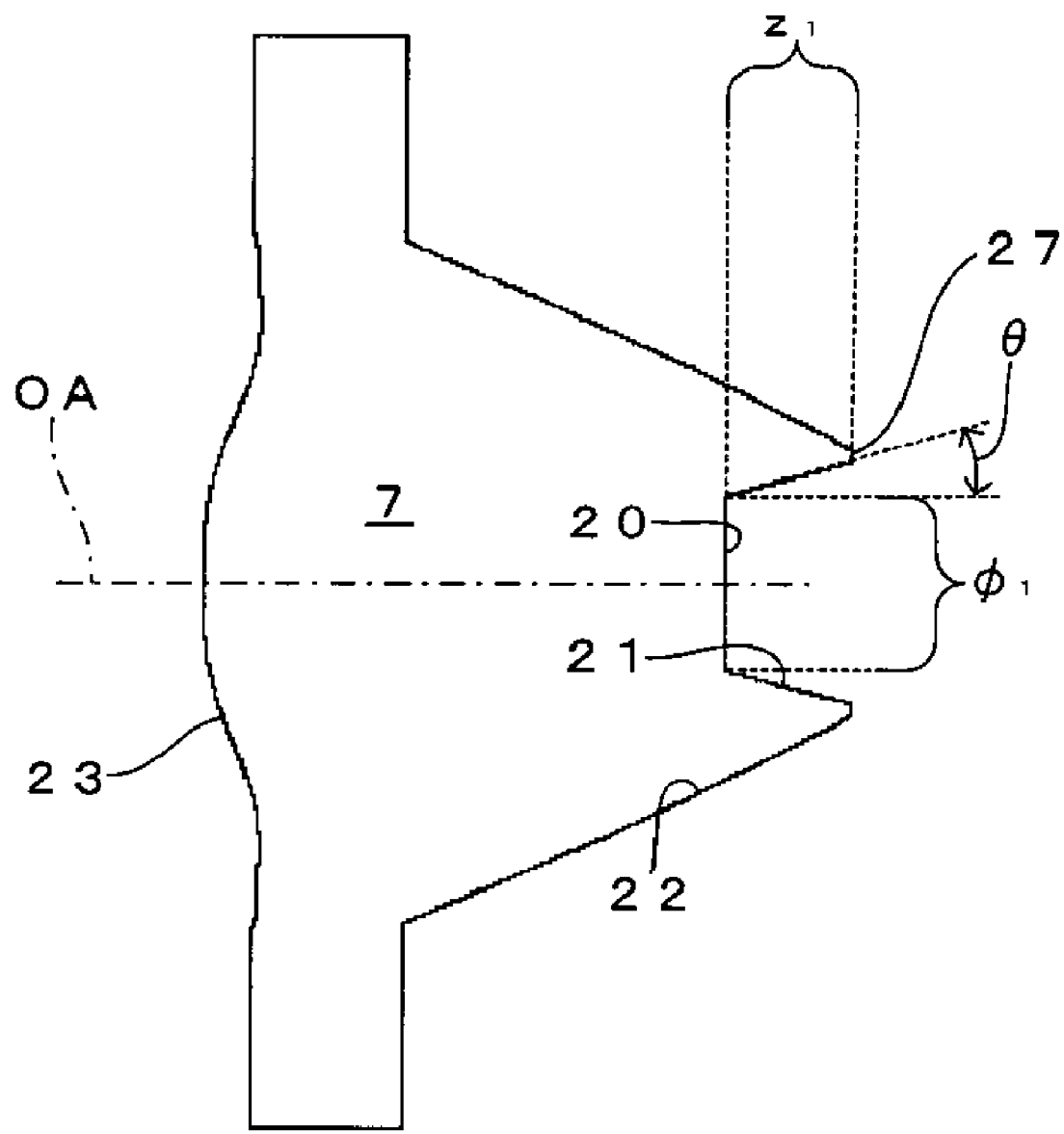
FIG. 18 illustrates a specific configuration of the sample in example 2.

To be more specific, as shown in FIG. 18, with the present example, first incidence surface 20 is designed to place its center on the optical axis OA and make its diameter φ1 4 millimeters.

Further, with the present example, first incidence surface 20 is designed to be arranged in a position where the distance z1 from the end part of the white light emitting diode 8 side in the concave part is 2.9 millimeters.

Furthermore, with the present example, second incidence surface 21 that expands its diameter from the outer peripheral end part of first incidence surface 20 to the white light emitting diode 8 side, is designed such that the angle θ formed by this incidence surface 21 and the optical axis OA is 15 degrees.

In addition to designing the concave part this way, the present example is designed such that, assuming that the position of emission surface 11 of light emitting part 10 in white light emitting diode 8 is height 0 millimeter and the direction from this position of height 0 millimeter toward the illuminated surface 18 along the optical axis OA is positive, flat plane 27 in the opposing surface part that opposes the light emitting diode is arranged in the position of the height 1.278 millimeters.

Also with the present example, designs are made to satisfy both equation 1 and equation 2 as is clear from the optical paths shown in FIG. 17.

Figure 19:
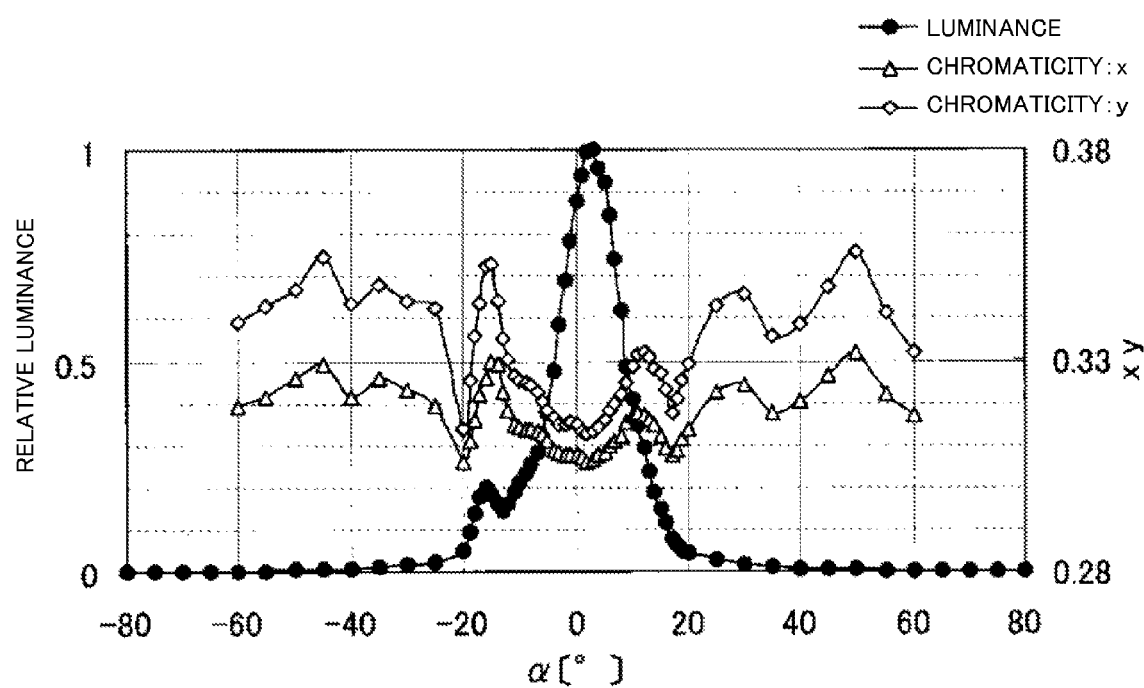
FIG. 19 is a graph showing a chromaticity and luminance measurement test result of the sample in example 2.

The test result of the measurement test of the sample in example 2 that has spotlight lens 7 manufactured based on these designs, are shown in FIG. 19. Further, values on the horizontal axis and the vertical axis in FIG. 19 are the same as in FIG. 7.

As shown in FIG. 19, with the present example, compared to comparison example 1, values for high relative luminous intensity are acquired around measurement angle α (degrees) near 0 degrees.

Similar to example 1, this means that, compared to the sample in comparison example 1, the sample in the present example is also suitable for spotlighting for radiating bright white light upon specific areas.

Further, as shown in FIG. 19, with the present example, the characteristics of x and y chromaticities can be made flat near chromaticity 0.33, compared to comparison examples 1 to 3. Similar to example 1, this means that the sample in the present example is also suitable for emitting illuminating light that is virtually a pure white and that produces little unevenness color compared to the samples in comparison examples 1 to 3.

Example 3

Figure 20:
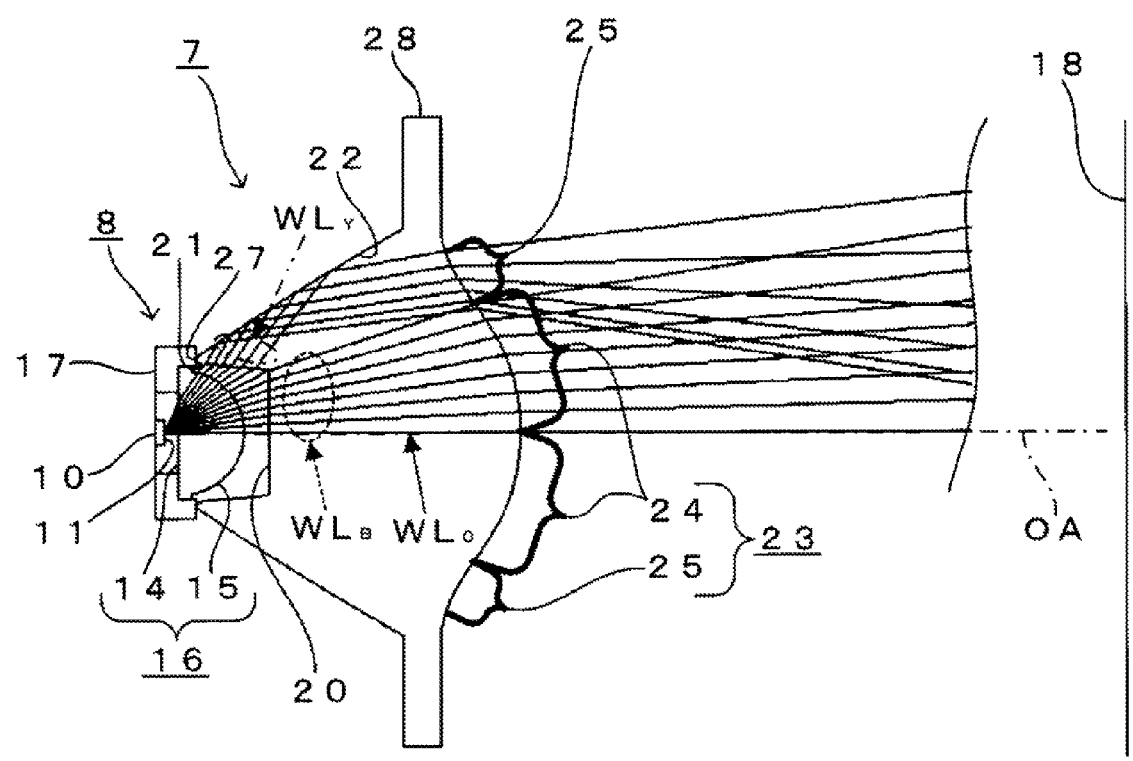
FIG. 20 is a configuration diagram showing the sample in example 3.

The sample in example 3 has the configuration shown in FIG. 20, and is formed with white light emitting diode 8 and spotlight lens 7 that is arranged to oppose the emitting side of this white light emitting diode 8.

Spotlight lens 7 used in the spotlight device in the present example will be explained using FIG. 21. As to explanation of spotlight lens 7, explanation of the same matter as in example 1 will be omitted.

Also, to manufacture spotlight lens 7 in the present example, a concave part formed with first incidence surface 20 and second incidence surfaces 21 is designed.

To design this concave part, the size of first incidence surface 20 in the present example is determined assuming FWHM 12 (degrees). Further, with the present example, to satisfy the specification (FWHM 12 (degrees)) for this spotlight device, a concave part is designed such that light fluxes emitted from white light emitting diode 8 are sorted and be incident in optimal proportions on first incidence surface 20 and second incidence surfaces 21.

Figure 21:
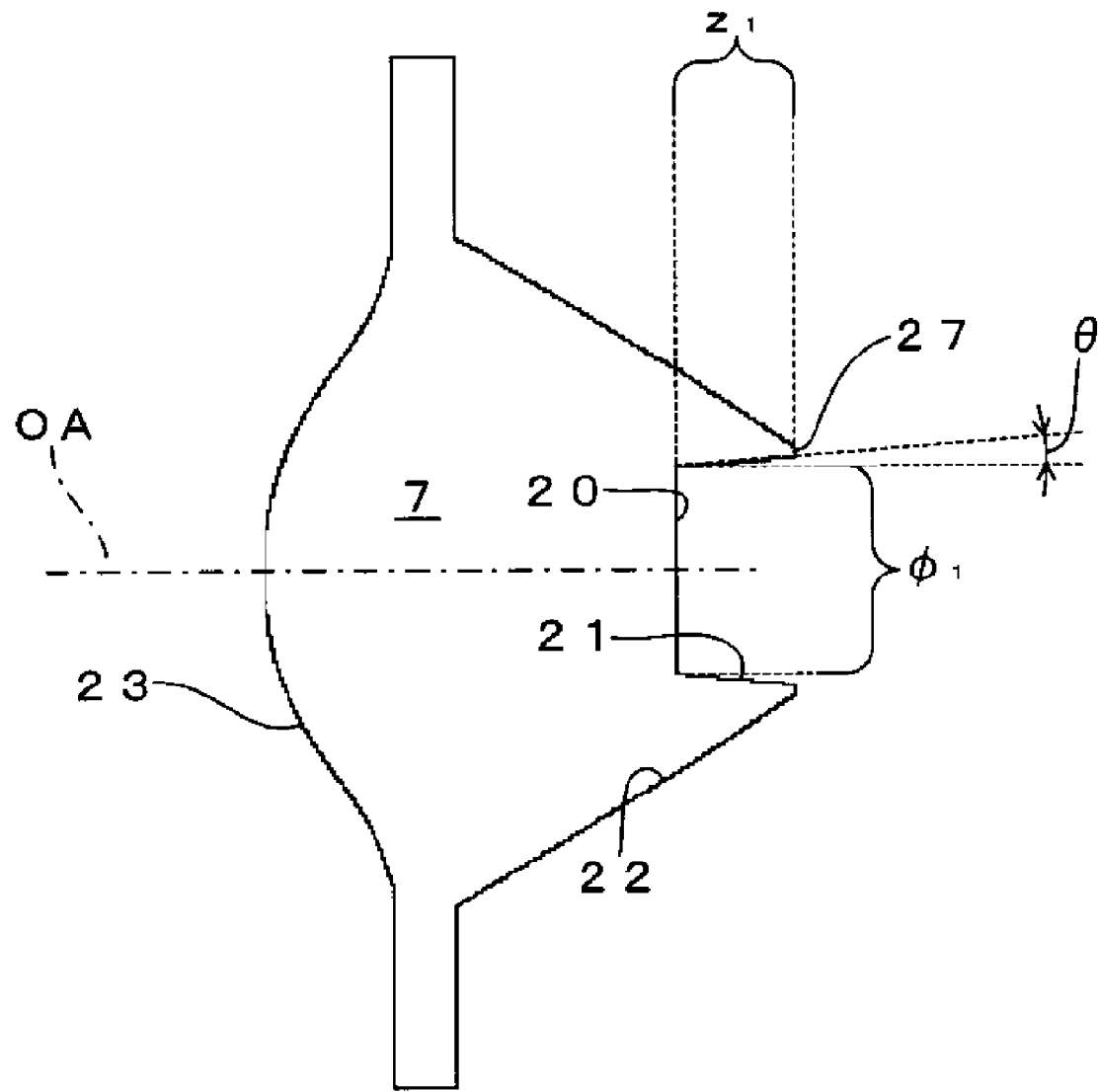
FIG. 21 illustrates a specific configuration of the sample in example 3.

To be more specific, as shown in FIG. 21, with the present example, first incidence surface 20 is designed to place its center on the optical axis OA and make its diameter $\phi 1$ 5 millimeters.

Further, with the present example, first incidence surface 20 is designed to be arranged in a position where the distance z1 from the end part of the white light emitting diode 8 side in the concave part is 2.9 millimeters.

Furthermore, with the present example, second incidence surface 21 that expands its diameter from the outer peripheral end part of first incidence surface 20 to the white light emitting diode 8 side, is designed such that the angle θ formed by this incidence surface 21 and the optical axis OA is 5 degrees.

In addition to designing the concave part this way, the present example is designed such that, assuming that the position of emission surface 11 of light emitting part 10 in white light emitting diode 8 is height 0 millimeter and the direction from this position of height 0 millimeter toward the illuminated surface 18 along the optical axis OA is positive, flat plane 27 in the opposing surface part that opposes the light emitting diode is arranged in the position of the height 1.278 millimeters.

Also with the present example, designs are made to satisfy both equation 1 and equation 2 as is clear from the optical paths shown in FIG. 20.

Figure 22:
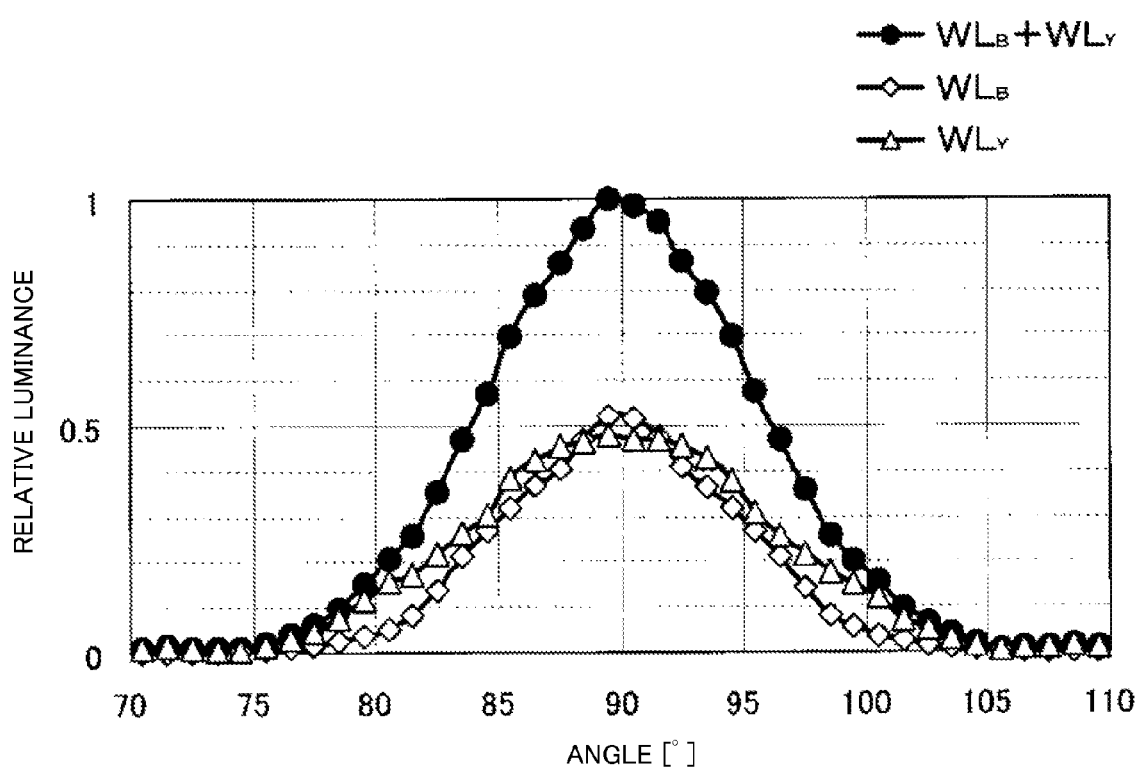
FIG. 22 is a graph showing light distribution design values of the sample in example 3.

Further, as shown in FIG. 22, with the present example, light distributions (light distribution characteristics) of bluish white light $WL_B$ and yellowish white light $WL_Y$ are designed to virtually match (become approximate in other words). To be more specific, the difference between the light distribution characteristics of both lights $WL_B$ and $WL_Y$ settles around 0.1 of the chromaticity difference at maximum. Further, values on the horizontal axis and the vertical axis in FIG. 22 are the same as in FIG. 15 of example 1.

Figure 23:
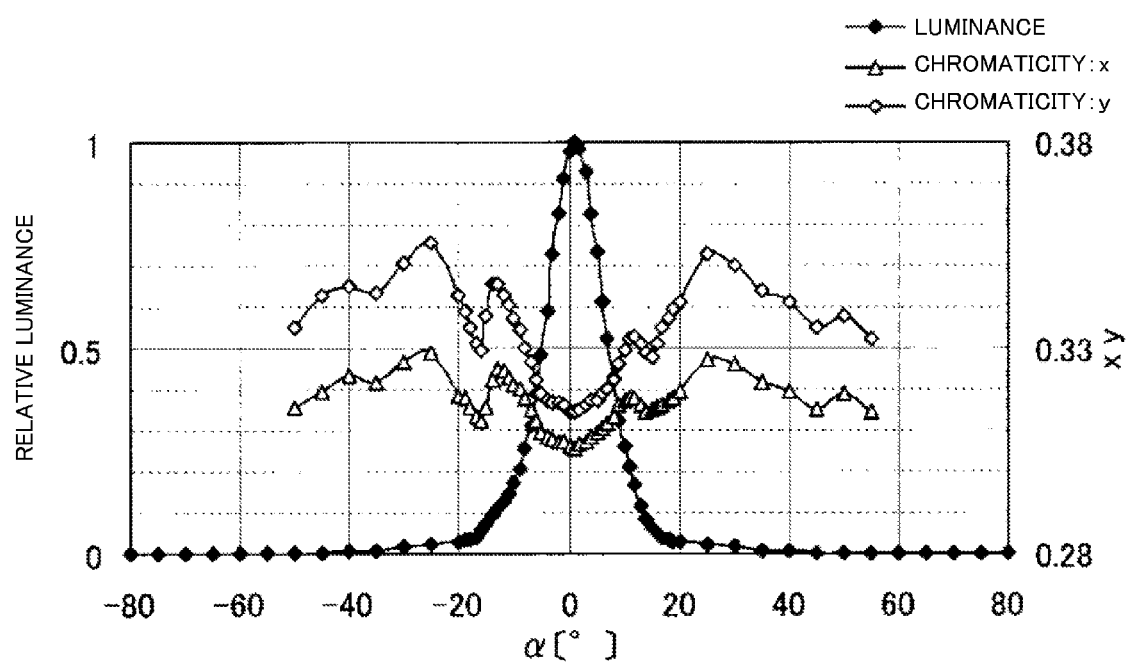
FIG. 23 is a graph showing a chromaticity and luminance measurement test result of the sample in example 3.

The test result of the measurement test of the sample in example 3 that has spotlight lens 7 manufactured based on these designs, are shown in FIG. 23. Further, values on the horizontal axis and the vertical axis in FIG. 23 are the same as in FIG. 7.

As shown in FIG. 23, with the present example, compared to comparison example 1, values for high relative luminous intensity are acquired around measurement angle α (degrees) near 0 degrees.

Similar to example 1, this means that, compared to the sample in comparison example 1, the sample in the present example is also suitable for spotlighting for radiating bright white light upon specific areas.

Further, as shown in FIG. 23, with the present example, the characteristics of x and y chromaticities can be made flat near chromaticity 0.33, compared to comparison examples 1 to 3 and examples 1 and 2. This means that the sample in the present example is very suitable for emitting illuminating light that is virtually a pure white and that produces little unevenness color.

Example 4

Figure 24:
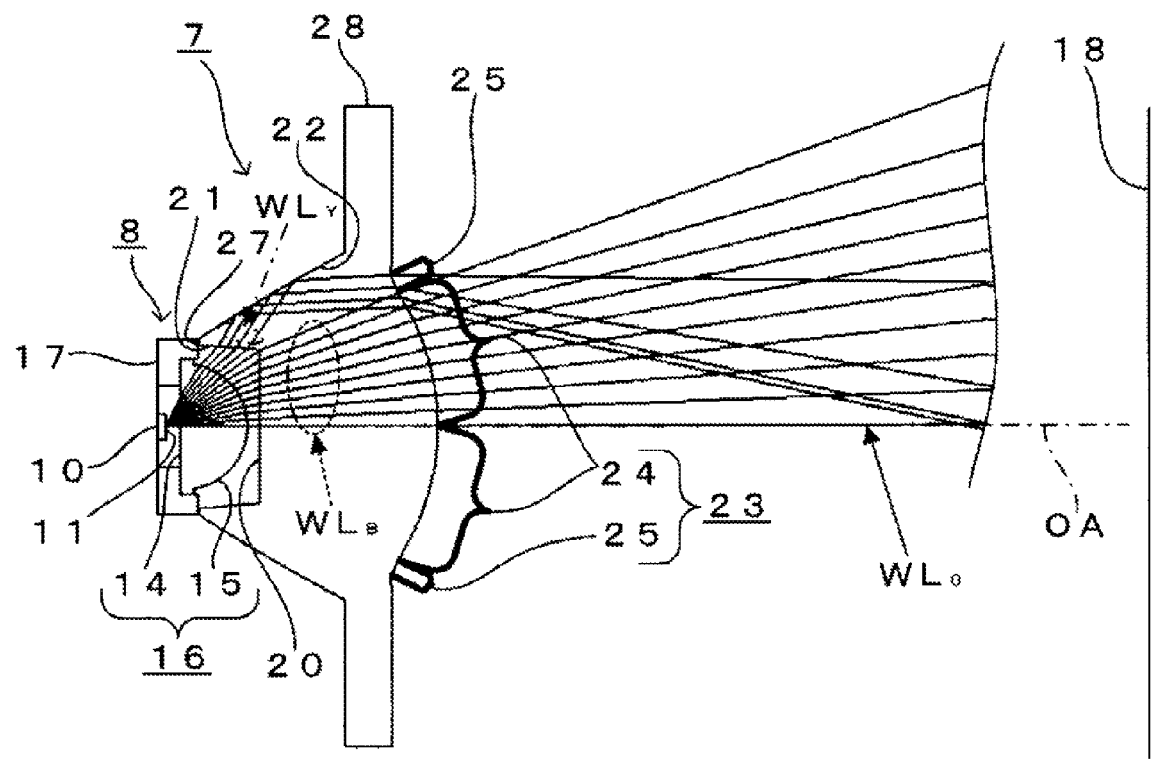
FIG. 24 is a configuration diagram showing the sample in example 4.

The sample in example 4 has the configuration shown in FIG. 24, and is formed with white light emitting diode 8 and spotlight lens 7 that is arranged to oppose the emitting side of this white light emitting diode 8.

Spotlight lens 7 used in the spotlight device in the present example will be explained using FIG. 25. As to explanation of spotlight lens 7, explanation of the same matter as in example 1 will be omitted.

Also, to manufacture spotlight lens 7 in the present example, a concave part formed with first incidence surface 20 and second incidence surfaces 21 is designed.

To design this concave part, the size of first incidence surface 20 in the present example is determined assuming FWHM 30 (degrees). Further, with the present example, to satisfy the specification (FWHM 30 (degrees)) for this spotlight device, a concave part is designed such that light fluxes emitted from white light emitting diode 8 are sorted and be incident in optimal proportions on first incidence surface 20 and second incidence surfaces 21.

Figure 25:
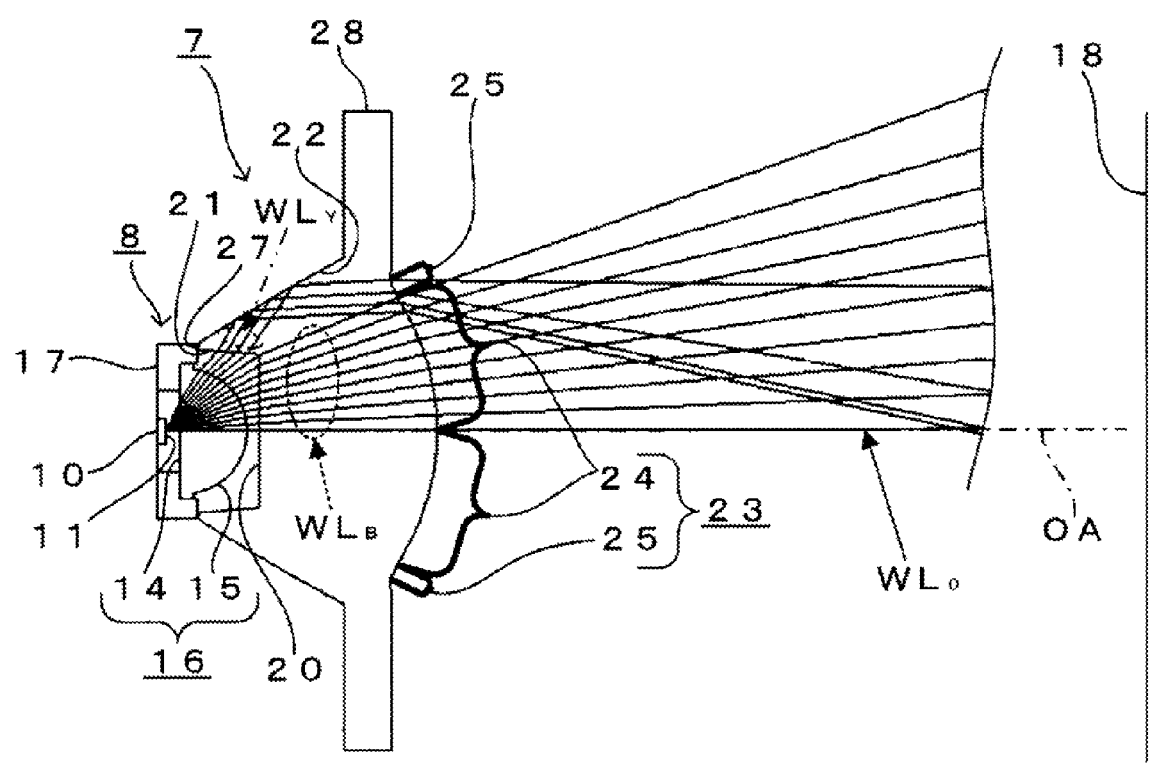
FIG. 25 illustrates a specific configuration of the sample in example 4.

To be more specific, as shown in FIG. 25, with the present example, first incidence surface 20 is designed to place its center on the optical axis OA and make its diameter $\phi 1$ 6 millimeters. Further, with the present example, first incidence surface 20 is designed to be arranged in a position where the distance z1 from the end part of the white light emitting diode 8 side in the concave part is 2.4 millimeters.

Furthermore, with the present example, second incidence surface 21 that expands its diameter from the outer peripheral end part of first incidence surface 20 to the white light emitting diode 8 side, is designed such that the angle θ formed by this incidence surface 21 and the optical axis OA is 5 degrees.

In addition to designing the concave part this way, the present example is designed such that, assuming that the position of emission surface 11 of light emitting part 10 in white light emitting diode 8 is height 0 millimeter and the direction from this position of height 0 millimeter toward the illuminated surface 18 along the optical axis OA is positive, flat plane 27 in the opposing surface part that opposes the light emitting diode is arranged in the position of the height 1.278 millimeters.

Also with the present example, designs are made to satisfy both equation 1 and equation 2 as is clear from the optical paths shown in FIG. 24.

Figure 26:
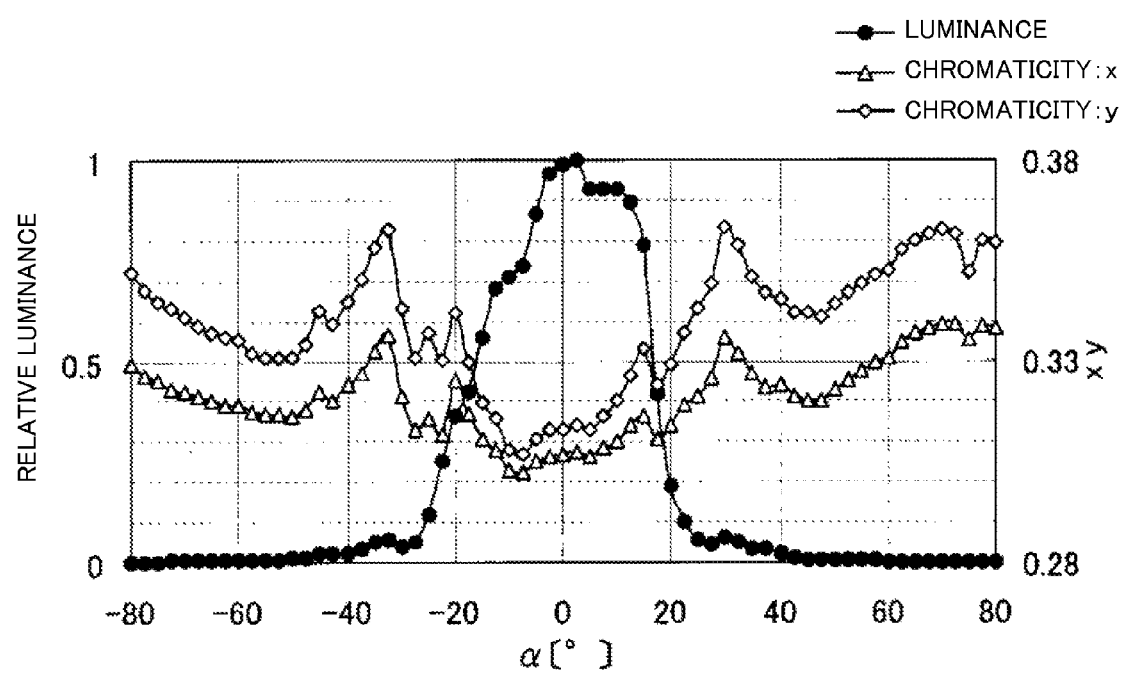
FIG. 26 is a graph showing a chromaticity and luminance measurement test result of the sample in example 4.

The test result of the measurement test of the sample in example 4 that has spotlight lens 7 manufactured based on these designs, are shown in FIG. 26. Further, values on the horizontal axis and the vertical axis in FIG. 26 are the same as in FIG. 7.

As shown in FIG. 26, with the present example, compared to comparison example 1, values for high relative luminous intensity are acquired around measurement angle α (degrees) near 0 degrees.

Similar to example 1, this means that, compared to the sample in comparison example 1, the sample in the present example is also suitable for spotlighting for radiating bright white light upon specific areas.

Further, as shown in FIG. 26, with the present example, the characteristics of x and y chromaticities can be made flat near chromaticity 0.33, compared to comparison examples 1 to 3. Similar to example 1, this means that the sample in the present example is also suitable for emitting illuminating light that is virtually a pure white and that produces little unevenness color compared to the samples in comparison examples 1 to 3.

Example 5

Figure 27:
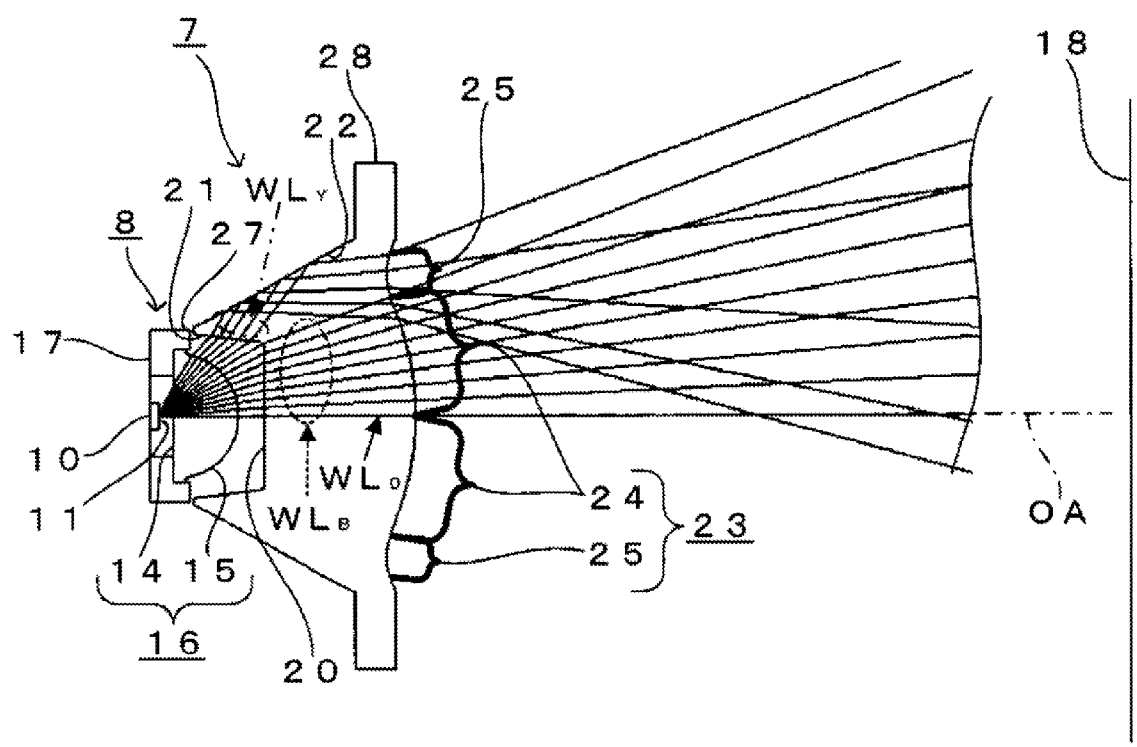
FIG. 27 is a configuration diagram showing the sample in example 5.
Figure 28:
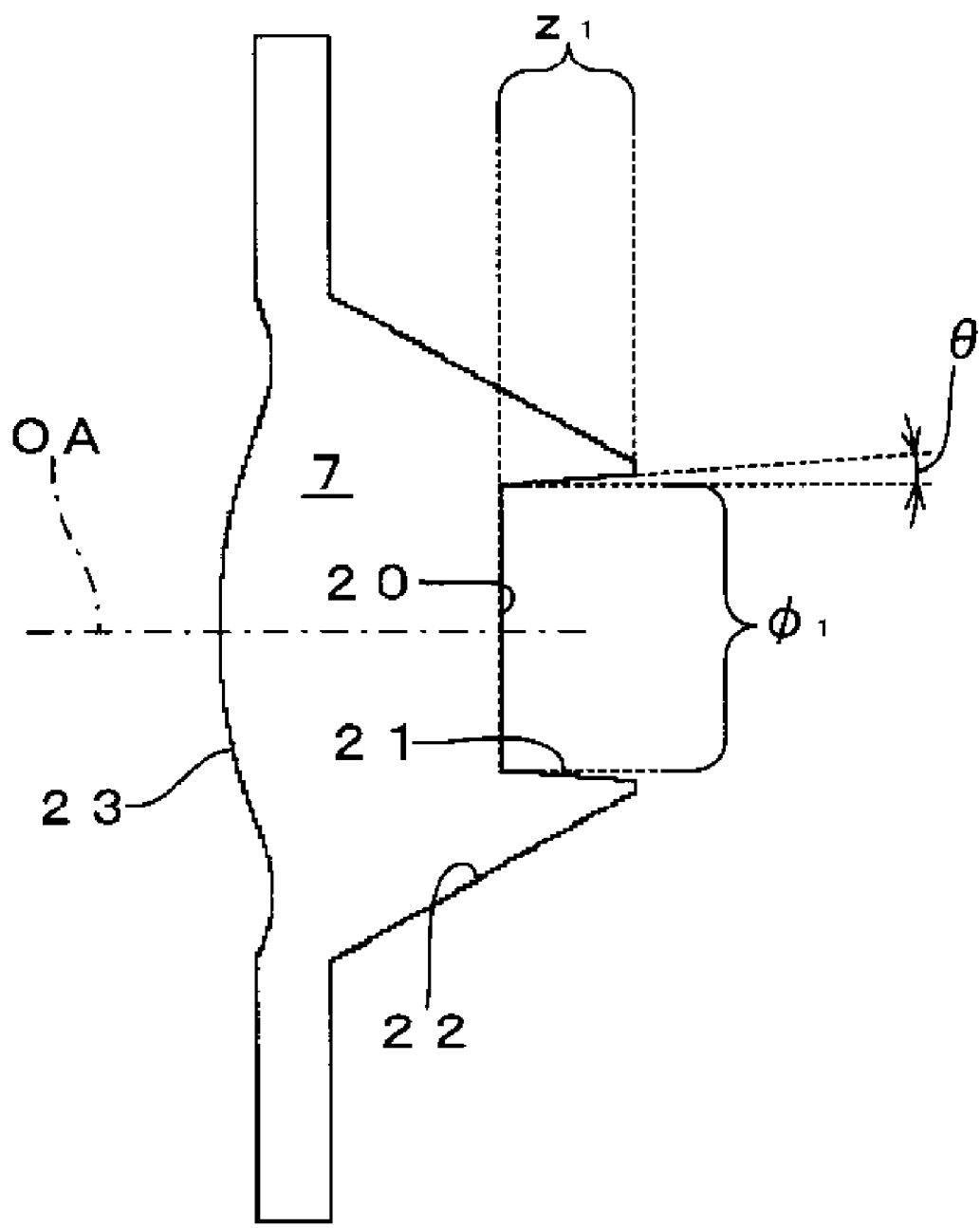
FIG. 28 illustrates a specific configuration of the sample in example 5.

The sample in example 5 has the configuration shown in FIG. 27, and is formed with white light emitting diode 8 and spotlight lens 7 that is arranged to oppose the emitting side of this white light emitting diode 8.

Spotlight lens 7 used in the spotlight device in the present example will be explained using FIG. 27. As to explanation of spotlight lens 7, explanation of the same matter as in example 1 will be omitted.

Also, to manufacture spotlight lens 7 in the present example, a concave part formed with first incidence surface 20 and second incidence surfaces 21 is designed.

To design this concave part, the size of first incidence surface 20 in the present example is determined assuming FWHM 32 (degrees). Further, with the present example, to satisfy the specification (FWHM 32 (degrees)) for this spotlight device, a concave part is designed such that light fluxes emitted from white light emitting diode 8 are sorted and be incident in optimal proportions on first incidence surface 20 and second incidence surfaces 21.

To be more specific, as shown in FIG. 18, with the present example, first incidence surface 20 is designed to place its center on the optical axis OA and make its diameter φ1 6 millimeters.

Further, with the present example, first incidence surface 20 is designed to be arranged in a position where the distance z1 from the end part of the white light emitting diode 8 side in the concave part is 2.8 millimeters.

Furthermore, with the present example, second incidence surface 21 that expands its diameter from the outer peripheral end part of first incidence surface 20 to the white light emitting diode 8 side, is designed such that the angle θ formed by this incidence surface 21 and the optical axis OA is 5 degrees.

In addition to designing the concave part this way, the present example is designed such that, assuming that the position of emission surface 11 of light emitting part 10 in white light emitting diode 8 is height 0 millimeter and the direction from this position of height 0 millimeter toward the illuminated surface 18 along the optical axis OA is positive, flat plane 27 in the opposing surface part that opposes the light emitting diode is arranged in the position of the height 1.278 millimeters.

Also with the present example, designs are made to satisfy both equation 1 and equation 2 as is clear from the optical paths shown in FIG. 24.

Figure 29:
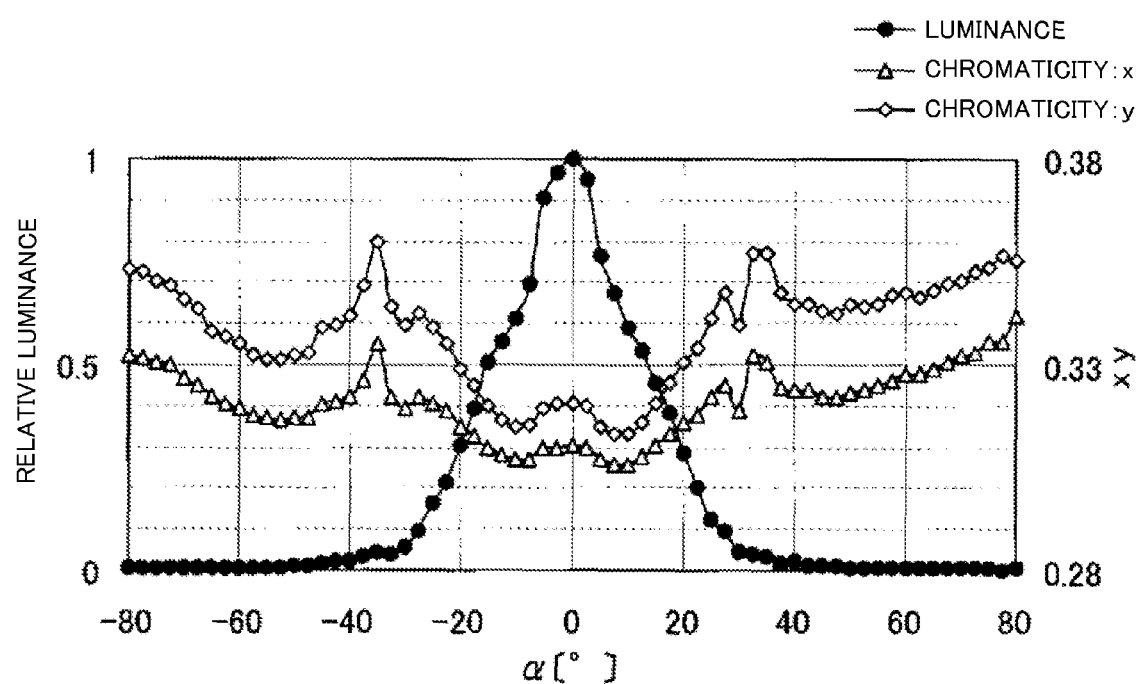
FIG. 29 is a graph showing a chromaticity and luminance measurement test result of the sample in example 5.

The test result of the measurement test of the sample in example 5 that has spotlight lens 7 manufactured based on these designs, are shown in FIG. 29. Further, values on the horizontal axis and the vertical axis in FIG. 29 are the same as in FIG. 7.

As shown in FIG. 29, with the present example, compared to comparison example 1, values for high relative luminous intensity are acquired around measurement angle α (degrees) near 0 degrees.

Similar to example 1, this means that, compared to the sample in comparison example 1, the sample in the present example is also suitable for spotlighting for irradiating bright white light upon specific areas.

Further, as shown in FIG. 29, with the present example, the characteristics of x and y chromaticities can be made flat near chromaticity 0.33, compared to comparison examples 1 to 3. Similar to example 1, this means that the sample in the present example is also suitable for emitting illuminating light that is virtually a pure white and that produces little unevenness color compared to the samples in comparison examples 1 to 3.

Moreover, the present invention is not limited to the above-described embodiment and can be variously modified where necessary.

For example, a light emitting element may employ a configuration removing condenser lens 16 from white light emitting diode 8 described in the above-described embodiment, or may have light emitting part 10 that emits white light using a diode that emits ultraviolet light and a fluorescent material that emits three red light, green light and blue light, instead of using the combination of a blue light emitting diode and a fluorescent material.

Further, total reflection surface 22 is not limited to a face shown by a line in a cross-sectional view including the optical axis OA, and may be a face shown by a curve.

The invention claimed is:

1. A lighting lens that allows incidence of white light emitted from a light emitting element and that adjusts the incident white light to light of desired light distribution characteristics and emits the white light to an illuminated surface side, the lighting lens comprising:
    an opposing surface part that opposes the light emitting element and that is arranged to oppose the light emitting element;
    an emission surface part that is formed on an opposite side of the light emitting element opposing the opposing surface part that opposes the light emitting element; and
    a side surface part that extends from an outer peripheral end part of the opposing surface part that opposes the light emitting element, to an outer peripheral end part of the emission surface part, wherein:
    a concave part that allows the white light to enter inside the lighting lens is formed in the opposing surface part that opposes the light emitting element;

the concave part comprises:
   a first incidence surface that is formed as a plane orthogonal to an optical axis; and
   a second incidence surface that is formed to extend from an outer peripheral end part of the first incidence surface to the light emitting element side and expand a diameter gradually toward the light emitting element;
the side surface part comprises a total reflection surface that is formed to expand a diameter gradually from the side of the opposing surface part that opposes the light emitting element, to the emission surface part side such that light having been incident on the second incidence surface is totally reflected toward the emission surface part;
the emission surface part comprises:
   a first emission surface that mainly allows incidence of light having been incident on the first incidence surface and that emits the incident light to the illuminated surface side; and
   a second emission surface that is connected to an outer peripheral end part of the first emission surface, surrounding the first emission surface, that allows incidence of the light having been incident on the second incidence surface and totally reflected by the total reflection surface, and that emits the incident light to the illuminated surface side; and
the second emission surface is formed such that positive power in the second emission surface is weaker than positive power in the first emission surface and radiates light upon the illuminated surface by mixing the light emitted from the first emission surface and the light emitted from the second emission surface.

2. The lighting lens according to claim 1, wherein the lighting lens makes: light distribution characteristics at a time when the light incident on the first incidence surface is emitted from the first emission surface; and light distribution characteristics at a time when the light incident on the second incidence surface is emitted from the emission surface part, match with each other or become approximate.

3. The lighting lens according to claim 1, wherein a conditional equation shown in following equation 1 is satisfied, $$\theta 1\ max > \theta 2\ max \tag{1}$$

where:
   $\theta 1$ max comprises a maximum value of an angle $\theta 1$ formed inside the lens by the optical axis and the light having been emitted from a light emitting spot of the light emitting element and incident on the first incidence surface; and
   $\theta 2$ max comprises a maximum value of an angle $\theta 2$ formed inside the lens by the optical axis and the light having been emitted from the light emitting spot of the light emitting element and totally reflected by the total reflection surface.

4. A lighting device that comprises the lighting lens and the light emitting element according to claim 1.

* * * * *